United States Patent [19]
Joffe et al.

[11] Patent Number: 5,407,519
[45] Date of Patent: Apr. 18, 1995

[54] APPARATUS FOR MANUFACTURING LIQUID CRYSTAL DISPLAY SCREENS

[75] Inventors: Benjamin Joffe, Chatsworth; Werner J. Schrall, Simi Valley, both of Calif.; Lawrence A. Simon, Mounds View, Minn.; Tom A. Kerekes, West Hills; Todd Johnson, Moorpark, both of Calif.

[73] Assignee: Interserv Corp., Bloomington, Minn.

[21] Appl. No.: 88,847

[22] Filed: Jul. 7, 1993

[51] Int. Cl.$^6$ ............................................. B32B 31/00
[52] U.S. Cl. ..................... 156/358; 156/367; 156/378; 156/379.8; 156/382; 156/556; 269/21
[58] Field of Search ............ 156/286, 378, 299, 273.7, 156/273.9, 275.5, 275.7, 379.8, 380.9, 382, 556, 104, 107, 99, 64, 358, 367, 580.1; 269/21

[56] References Cited

U.S. PATENT DOCUMENTS

| | | | |
|---|---|---|---|
| 3,661,661 | 5/1972 | Berleyoung | 156/580.1 |
| 3,910,620 | 10/1975 | Sperry | 269/21 |
| 4,222,635 | 9/1980 | Jülke | 156/275.5 |
| 4,299,639 | 11/1981 | Bayer | 156/104 |
| 4,521,114 | 6/1985 | Van Peski et al. | 269/21 |
| 4,799,722 | 1/1989 | Marzinotto | 269/21 |
| 4,923,552 | 5/1990 | Fukushima | 156/275.5 |
| 4,964,941 | 10/1990 | Von Brandt et al. | 156/556 |
| 5,106,441 | 4/1992 | Brosig et al. | 156/273.7 |
| 5,118,371 | 6/1992 | Hori et al. | 156/104 |
| 5,222,203 | 6/1993 | Ozimek | 156/378 |
| 5,225,026 | 7/1993 | Ozawa | 156/378 |
| 5,231,923 | 8/1993 | Ohta et al. | 156/378 |

*Primary Examiner*—Chester T. Barry
*Attorney, Agent, or Firm*—Patterson & Keough

[57] ABSTRACT

An apparatus and method for fabricating a flat panel display having a display area greater than 645 square centimeters. The flat panel display is comprised of an upper glass plate and a lower glass plate and has data generation material interposed between the upper glass plate and the lower glass plate. The flat panel display is formed by aligning the suitably etched upper glass plate with respect to the suitably etched lower glass plate in the X, Y, and Z planes. During formation, the upper glass plate has spacing devices disposed on the lower side thereof and the lower glass plate has bonding material deposited on the upper side thereof. The apparatus includes a lower plate XY stage device for supporting the lower glass plate, the lower plate XY stage device being adjustable in the X and Y planes. An upper plate positioning stage device is included for supporting the upper glass plate. The upper plate positioning stage device has gimbal devices that permit motion of the upper glass plate in the X, Y and Z planes and in pitch and yaw. A Z-axis drive device positions the upper plate with respect to the lower glass plate. A vacuum device draws a vacuum around and between the upper and lower glass plates, which vacuum urges the lower surface of the upper glass plate into parallel alignment with the upper surface of the lower glass plate, spaced apart by the spacing devices. An alignment device aligns the upper and lower glass plates while a curing device the sets of the bonding material, bonding the upper and lower glass plates together.

20 Claims, 13 Drawing Sheets

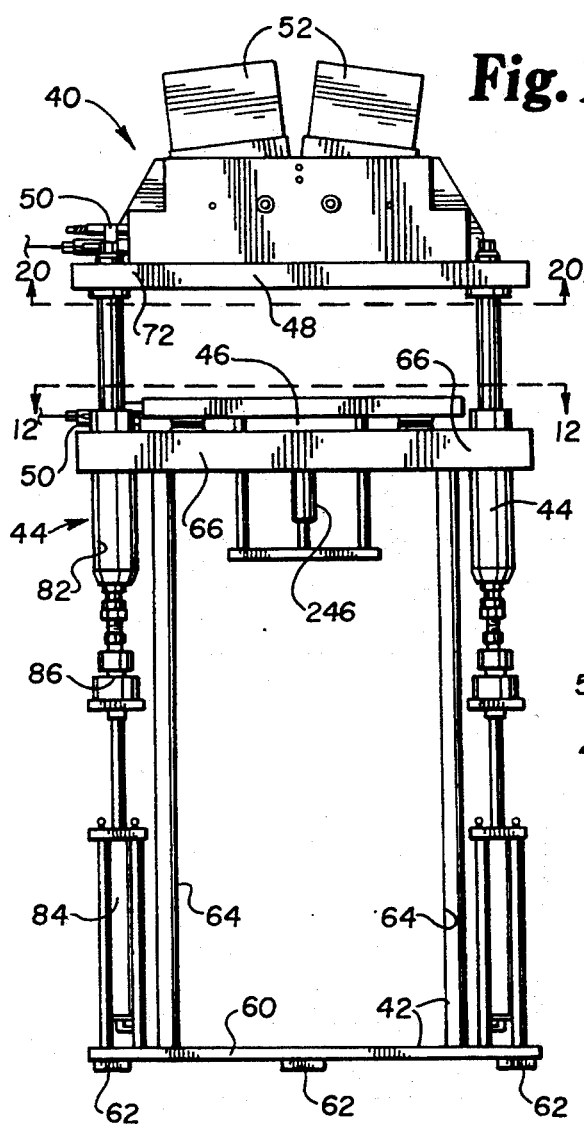
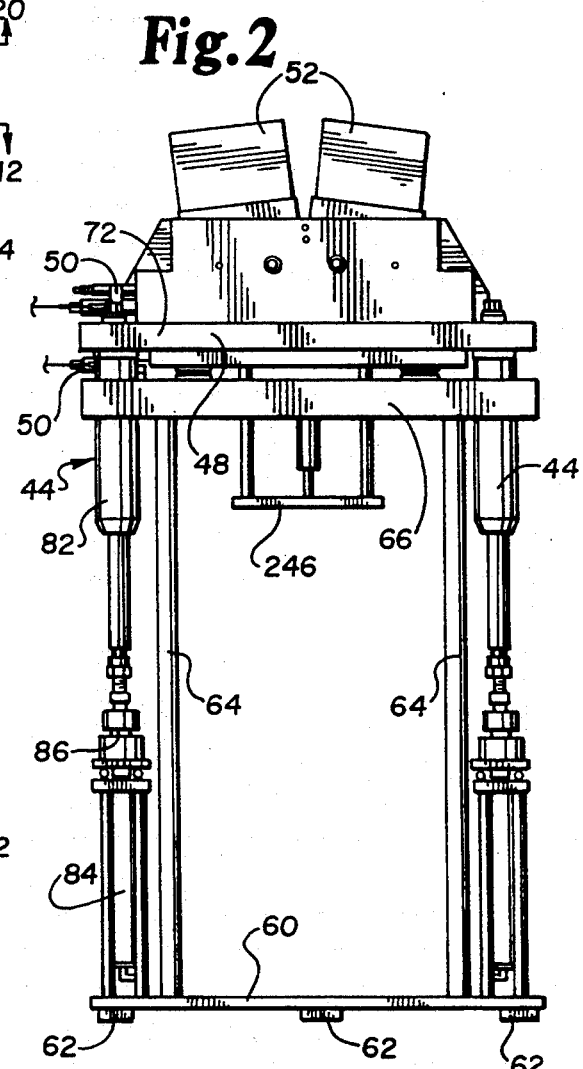
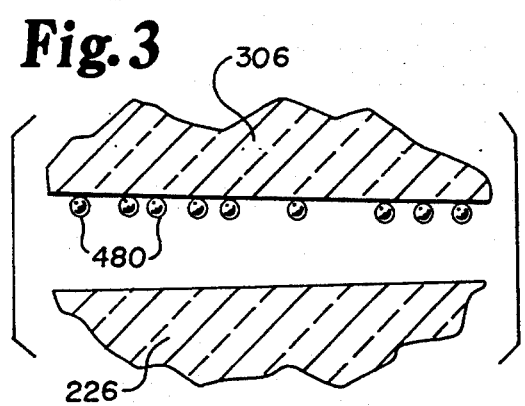
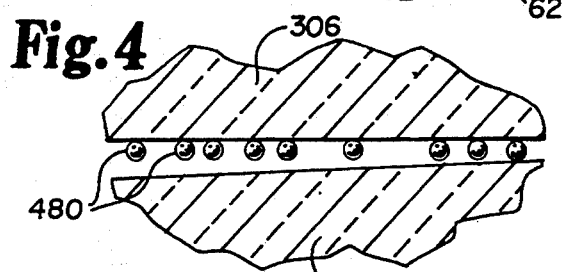
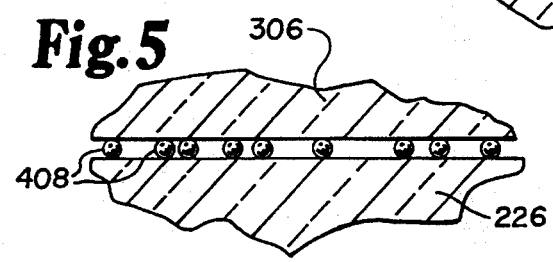

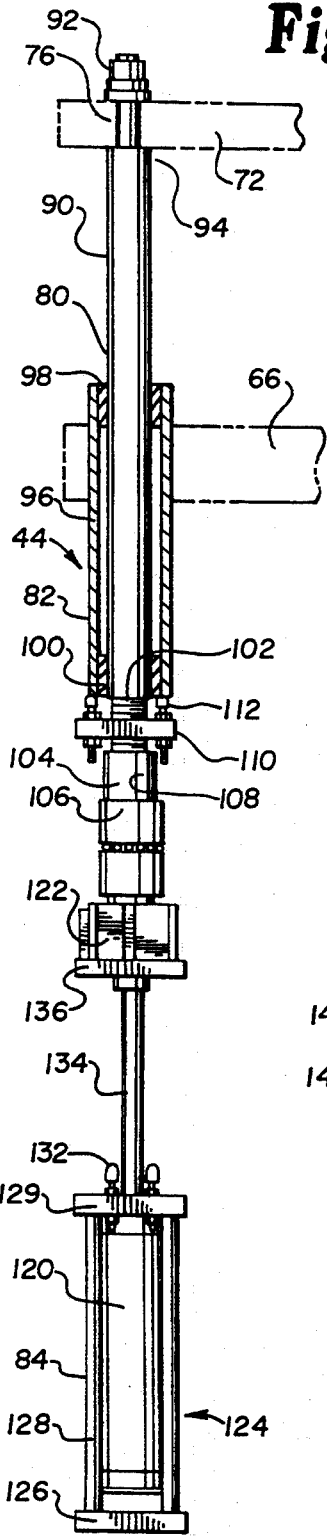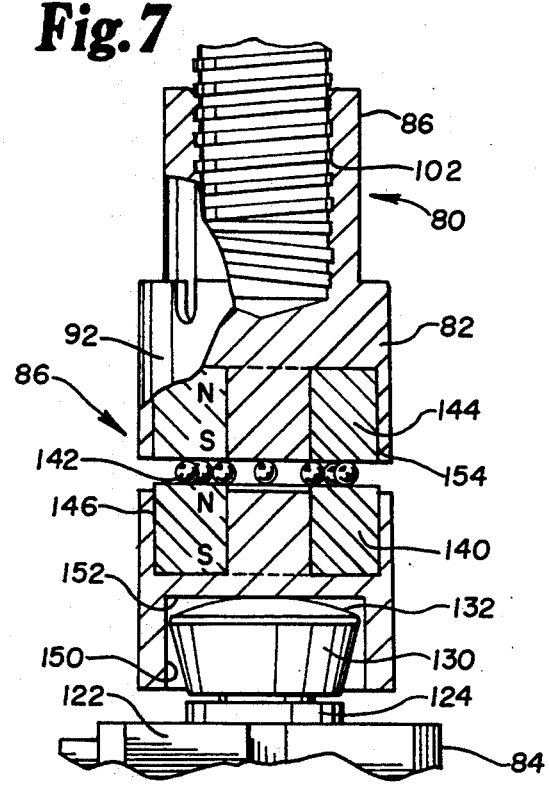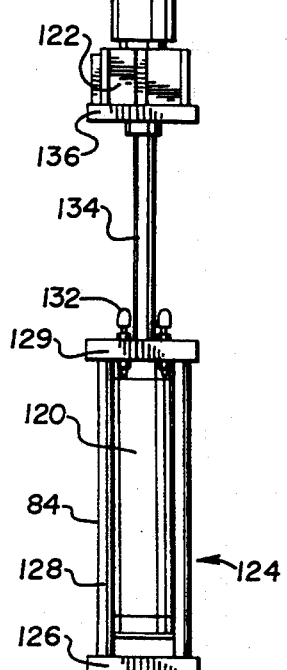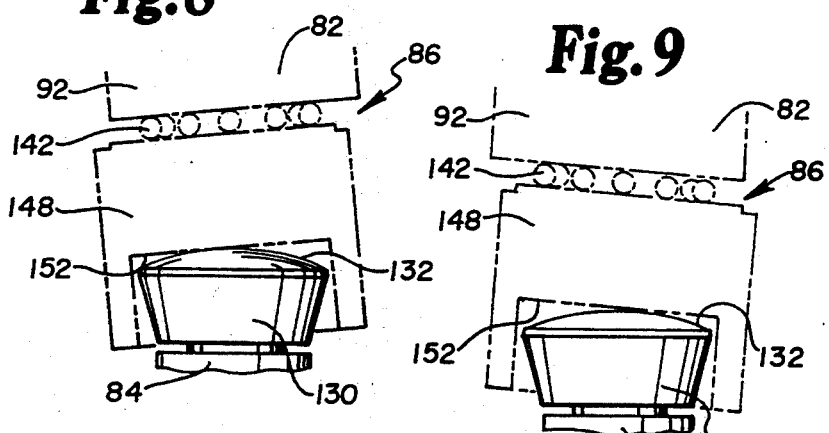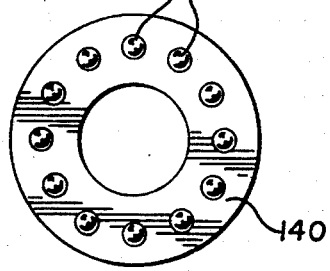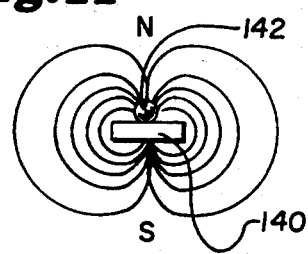

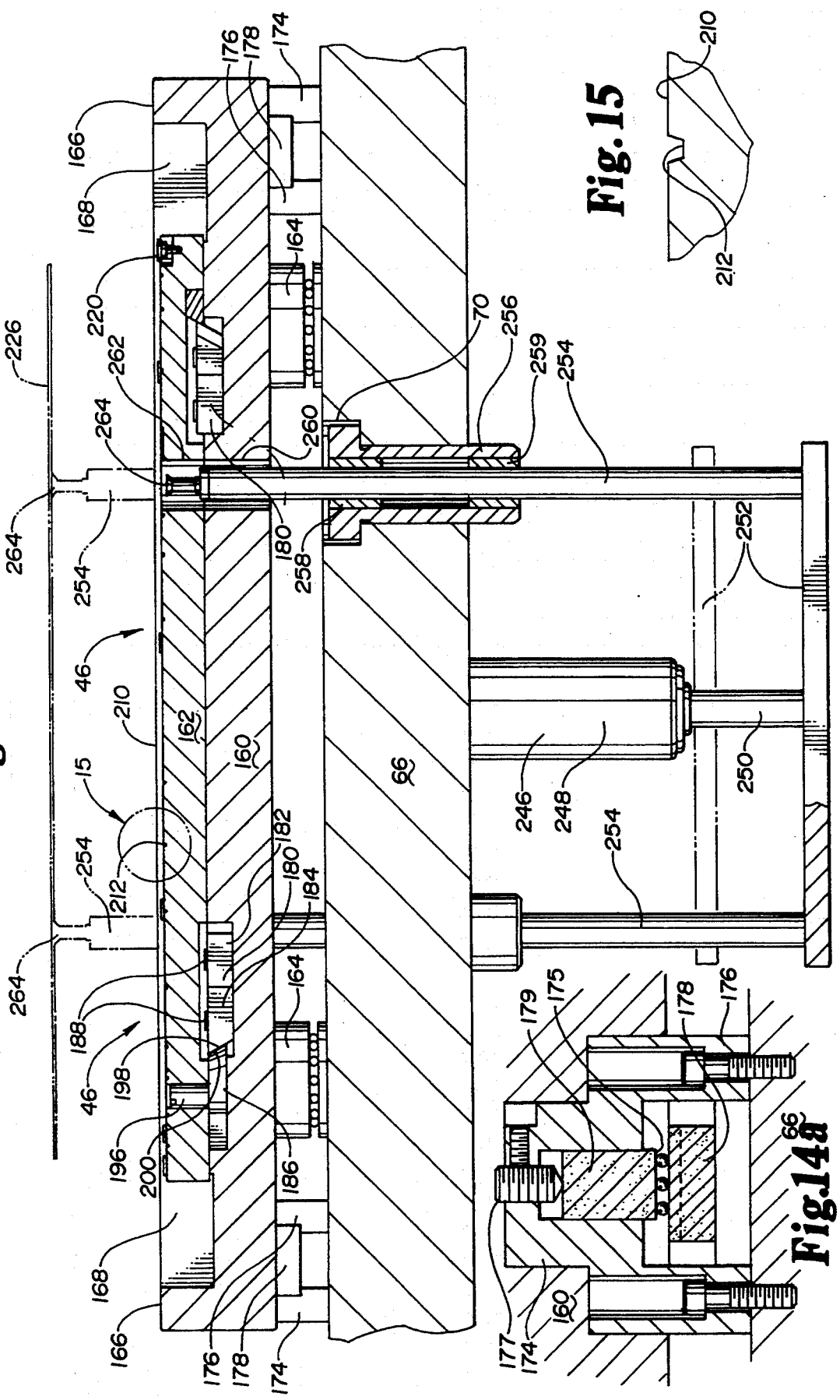

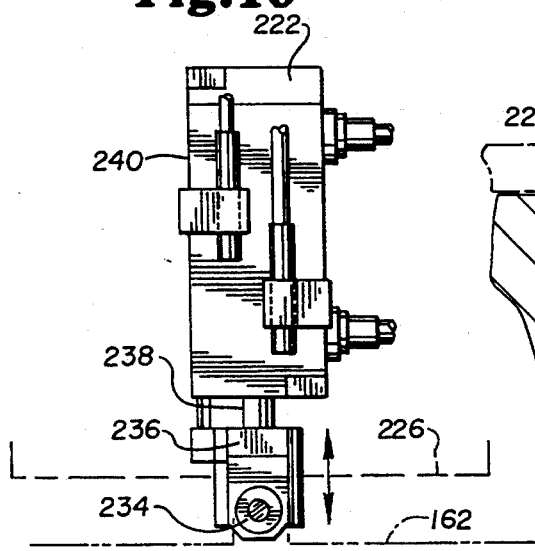
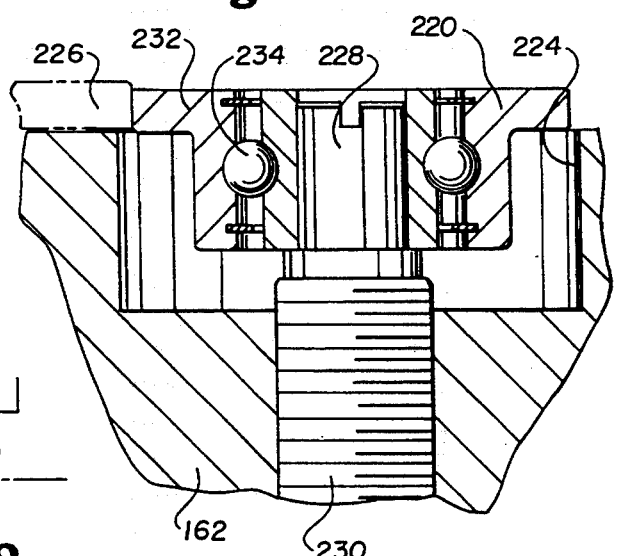
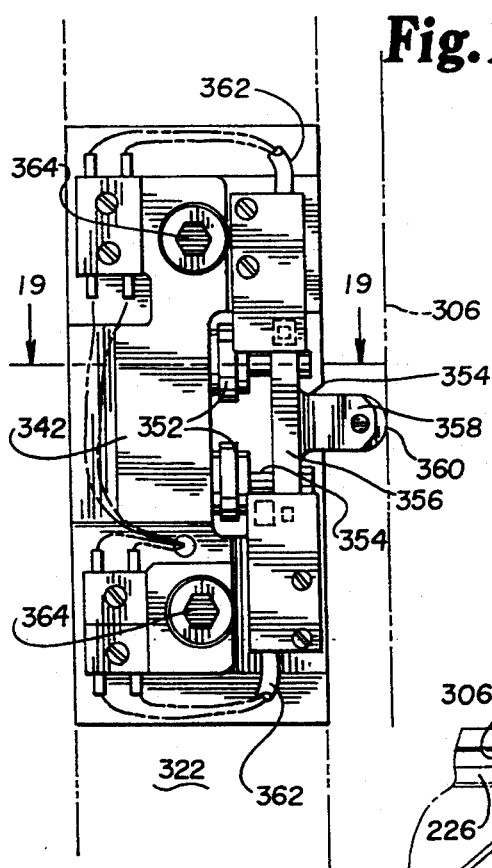
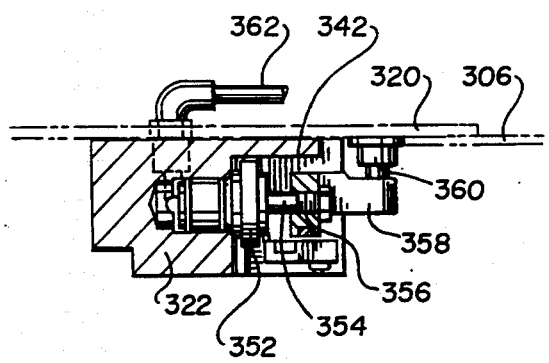
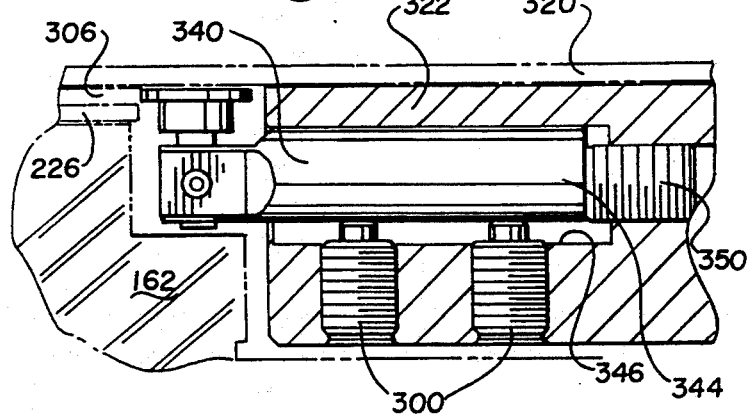

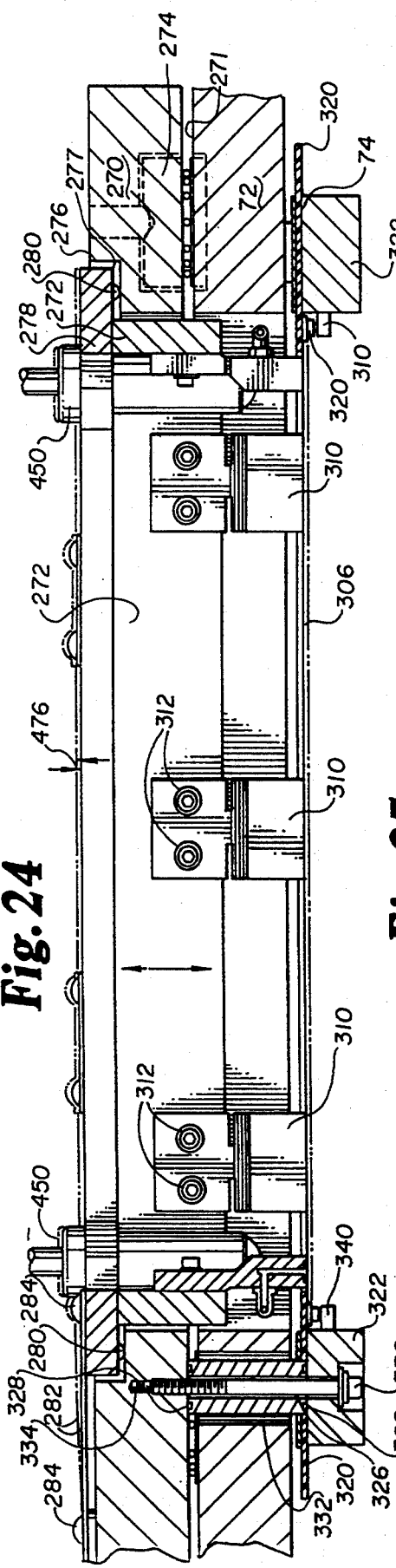
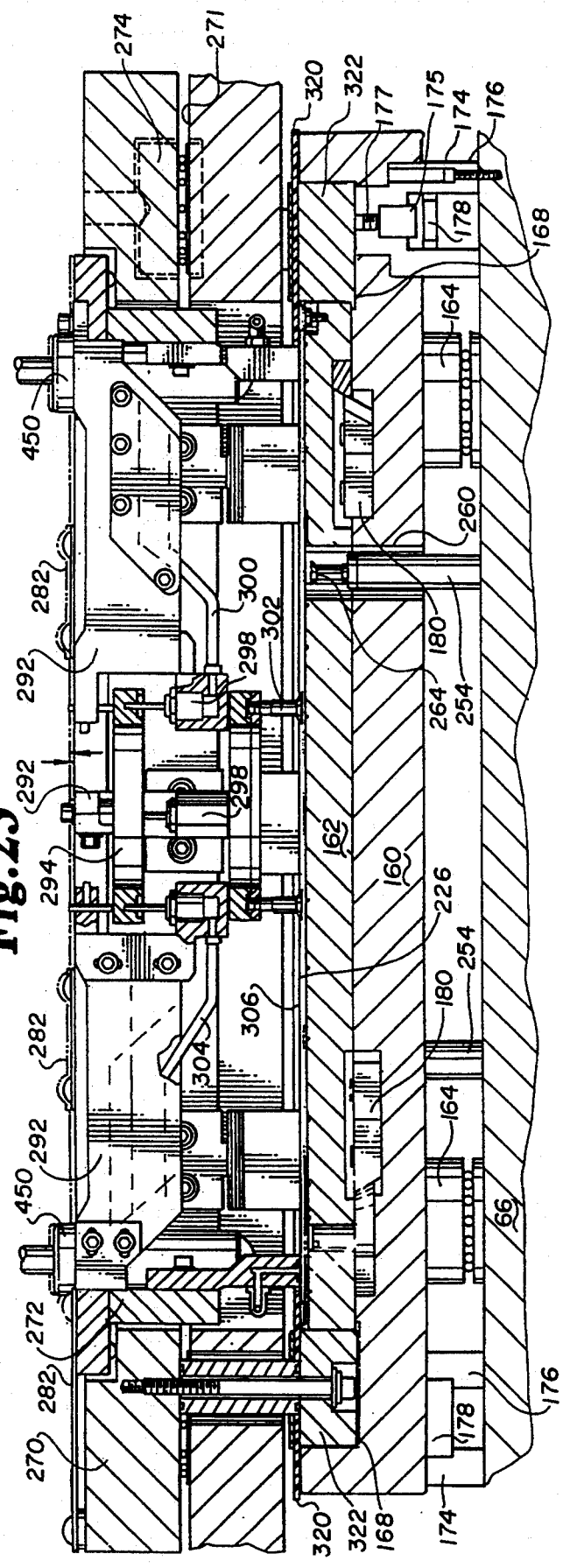
Fig. 24
Fig. 25

APPARATUS FOR MANUFACTURING LIQUID CRYSTAL DISPLAY SCREENS

TECHNICAL FIELD

The invention relates to an apparatus useful in the manufacturing of flat panel displays (FPD) and particularly liquid crystal display (LCD) screens. More particularly, it relates to an improved apparatus that is capable of more accurately aligning the two glass plates forming the FPD display in the X, Y, and Z axes.

BACKGROUND OF THE INVENTION

LCD screens are currently on the market in both commercial and military applications. Such displays are of relatively small display area. There is a need for ever larger displays, with current demands looking at displays on the order of fifteen inches by fifteen inches and larger. Such displays must have great resolution and present a color display. Such requirements present new fabrication challenges that did not exist for the smaller area displays.

LCD's use a liquid crystal to transmit or block the light that creates the image. Liquid crystal is an oily substance that contains thread-like or pneumatic molecules. The liquid crystal compound flows like a liquid, but has a crystalline order in the arrangement of its molecules. These molecules reorient themselves along electric field lines to transmit or block the light that creates the image.

The present invention is useful in fabricating active matrix LCD's (AMLCD's). AMLCD's are essentially a giant integrated circuit with millions of thin-film transistor (TFT) switches fabricated onto a single glass plate. There are several key processes in the fabrication of the TFT layer. The glass plate is purified of alkali metals, which might contaminate the transistors or the liquid crystal. The glass plate is poured so that it is extremely flat. And, the semiconductor layer is deposited by a plasma process which condenses a random network of silicon that is rich in hydrogen on the glass. Finally, metal electrodes, insulators, and other elements in the TFT are deposited in a manner similar to that used in the fabrication of integrated circuits, although the deposition is over a much greater surface area.

The liquid crystal material is sealed between two glass plates, one bearing the TFT's to control the electrodes of each cell, the other bearing color filters and an electrode to complete all the circuits. Each cell is a single color pixel. Each cell must be accurately aligned and there are literally more than a million pixels in a single display. This establishes the requirement for extreme accuracy in alignment of the two etched glass plates.

In final fabrication of the display both the lower and the upper glass plate are etched prior to being placed together to form the display. The two plates are glued together with a spacing medium between the two plates. The spacing medium typically is very small spheres that, prior to gluing the two plates together, are adhered to the underside of the upper plate by static electricity. Strips of glue are placed on the upper side of the lower plate and the two plates are brought close together. The distance between the plates is determined by diameter of the spheres. The glue that is used is sensitive to ultra-violet light. Upon exposure to ultra-violet light, the glue cures, bonding the two plates and producing the finished LCD screen.

It is important to realize that the misalignments of the upper and lower plate can be physically very small and yet produce the very low production yields that are presently being experienced in the industry. Current production of large area AMLCD's is being done mostly in Japan. The best information indicates that alignment of the glass plates is being done by what can be described as the "toothpick" method, that is, the two glass plates are being aligned with respect to one another manually using fine instruments not unlike toothpicks. Estimates of the production yields of the devices are that only ten percent of AMLCD's produced meet specifications. In the past, manufacturing devices for small LCD displays have aligned the upper and lower glass plates in the X and Y planes prior to gluing with adequate accuracy to satisfy the needs of the relatively small LCD's.

The increased size of the plates that are being utilized today requires devices that are capable of aligning such enlarged plates. Additionally, improvement in resolution of such devices requires even greater degrees of accuracy in aligning the two plates in the X, Y and Z planes prior to gluing and while the glue is setting up. In the past, as the glue was setting up, the two plates would frequently shift with respect to one another and thereby degrade the resolution. Additionally, with increased plate size, it is very important that the two plates be uniformly distanced apart in the Z plane as the glue is setting.

Despite the care taken in the production of the two glass plates to ensure that their surfaces are perfectly planar, the two glass plates frequently are slightly wedge shaped. On a fifteen inch square glass plate, the tolerance is ±100 microns. In the worst case of two glass plates being positioned together, this would result in a 200 micron spacing between the two at the widest point. This is much too great for usage in a large LCD. For improved resolution, it is desired that the two plates be separated by the exact diameter of the spacing spheres, which are preferably 5 microns in diameter. In practice in the past, if the high point of a wedge on the lower plate aligns with a downwardly extending point of a wedge from the upper plate and a spacing sphere happens to be interposed between those two points, that will determine the minimum closeness of the two plates. Fabrication devices did not allow for pitch or yaw of the two plates with respect to one another to account for the spacing errors caused the wedge shape. This was less of a problem when the plates were substantially smaller in area than those desired to be utilized at the present.

An example of the prior art production devices is described in U.S. Pat. No. 4,923,552. This device utilizes a fixed, descending upper fixture to lower the upper glass plate onto the lower glass plate that is supported by the lower fixture. The two glass plates in their final alignment will only be as parallel with one another as the upper fixture and the lower fixture are parallel. Additionally, an advancing sheet of transparent film is utilized to provide a vacuum seal around the two glass plates while the glue is setting. This is a cumbersome apparatus to utilize and it effectively precludes continuous fine alignment of the two glass plates as the glue is setting.

It would be a decided advantage to have a manufacturing apparatus that would produce relatively large LCD screens with increased production yields.

SUMMARY OF THE INVENTION

The present invention is a manufacturing apparatus that provides for producing relatively large LCD screens. The manufacturing apparatus of the present invention is able to accomplish this by very accurately fixing the X, Y alignment of the upper glass plate and the lower glass plate that comprise the LCD screen and by accurately fixing the uniformity of the distance in the Z direction between the upper glass plate and the lower glass plate. This accurate alignment is maintained by continually adjusting that alignment while the glue is setting.

The present invention incorporates the ability to grasp and retain the upper glass plate in position by vacuum devices. Additionally, it is possible to lower the upper glass plate into place on the lower glass plate and to adjust the upper glass plate in both pitch and yaw to establish a virtually parallel relationship between the upper glass plate and the lower glass plate.

Another unique feature of the present apparatus provides for a much more uniform spacing between the lower plate and a upper plate. After the upper plate and the lower plate are placed together with the spacing spheres held in between, a seal device provides an air tight area that includes the space between the two glass plates. A vacuum is drawn between the two plates. This vacuum uniformly applies a substantial force to the two glass plates, causing the upper plate to rotate in pitch and yaw to accommodate any irregularities in the glass plates. The glass plates are drawn together a distance that is uniformly determined by the spacing spheres. By doing this, the overall spacing between the two plates equals the diameter of a single spacing sphere.

Unique to this manufacturing apparatus are magnetic joints that are utilized in a variety of applications throughout the apparatus. The magnetic forces of the magnetic joints function in two planes. The magnetic forces Act in a first plane attract the two portions of the apparatus that are being joined and act in a second plane in a self centering manner to accurately align the two portions being joined. These unique joints are used in a number of applications in the present invention in order to provide lubrication free, virtually frictionless, self-centering joints and alignment biasing.

Another unique feature of the present invention is the traverse adjusting mechanisms. Traverse adjusters are utilized to continually position the two plates with respect to each other by continually making minuter adjustments in the X, Y planes. The traverse adjusters are servo driven and are positioned responsive to a camera sight system that can very accurately determine the exact alignment of the upper plate relative to the lower plate. While the glue is curing, the camera system continually senses the exact alignment of the upper and the lower plate and feeds the information to the various servo adjusting mechanisms. This results in minute adjustments being made while the curing is actually taking place, resulting in much more accurate final alignment of the upper plate and the lower plate.

BRIEF DESCRIPTION OF THE DRAWINGS

FIG. 1 is a side perspective view of an automated LCD assembly machine in accordance with the present invention, with the Z axis drive in its fully extended position.

FIG. 2 is a side perspective view of the automated LCD assembly machine with the Z axis drive in its fully retracted position.

FIG. 3 is a fragmentary, sectional view of the upper glass plate poised in the prestage position above the lower glass plate.

FIG. 4 is a fragmentary, sectional view of the upper glass plate similar to FIG. 3, but with the lower glass plate in the staged position.

FIG. 5 is a fragmentary, sectional view of the upper glass plate similar to FIG. 3, but with the lower glass plate depicted after drawing the vacuum between the two plates.

FIG. 6 is an elevational view of one of the Z axis drive posts with portions broken out to show interior mechanization.

FIG. 7 is a fragmentary elevational view of the magnetic bearing of the Z axis drive with the portions broken away to show the interior structure of the magnetic bearing.

FIG. 8 is a side perspective of the curve of the bearing cap with the magnetic bearing and phantom lines depicting the effect of the Z axis drive tilted to the left.

FIG. 9 is a side perspective of the curve bearing cap with the magnetic bearing and phantom showing the effects of the Z axis drive tilted to the right.

FIG. 10 is a upper perspective of one half of the magnetic bearing showing the array of ball bearings on the ring magnet.

FIG. 11 is a sectional view of a ring magnet showing the magnetic effects produced by the magnet.

FIG. 14 is a sectional view taken along line 14 FIG. 12 of base plate and the lower plate receiver.

FIG. 15 is a perspective of a vacuum groove taken along circle 15 of FIG. 14.

FIG. 16 is a upper perspective of the lower adjustable banking pin.

FIG. 17 is a side sectional perspective taken along line 17 of FIG. 12 showing construction of the banking pin head.

FIG. 18 is a lower perspective of a upper adjustable banking pin.

FIG. 19 is a sectional view of the upper adjustable banking pin taken along line 19 of FIG. 18.

FIG. 22 is a side sectional perspective of the upper stationary banking pin taken along line 22 in FIG. 20.

FIG. 24 is a side sectional view of the upper plate positioning stage and upper plate receiver taken along line 24 of the FIG. 20.

FIG. 25 is a sectional view of the upper plate receiver and lower plate receiver in the staged position.

DETAILED DESCRIPTION OF THE DRAWINGS

Figure 12:
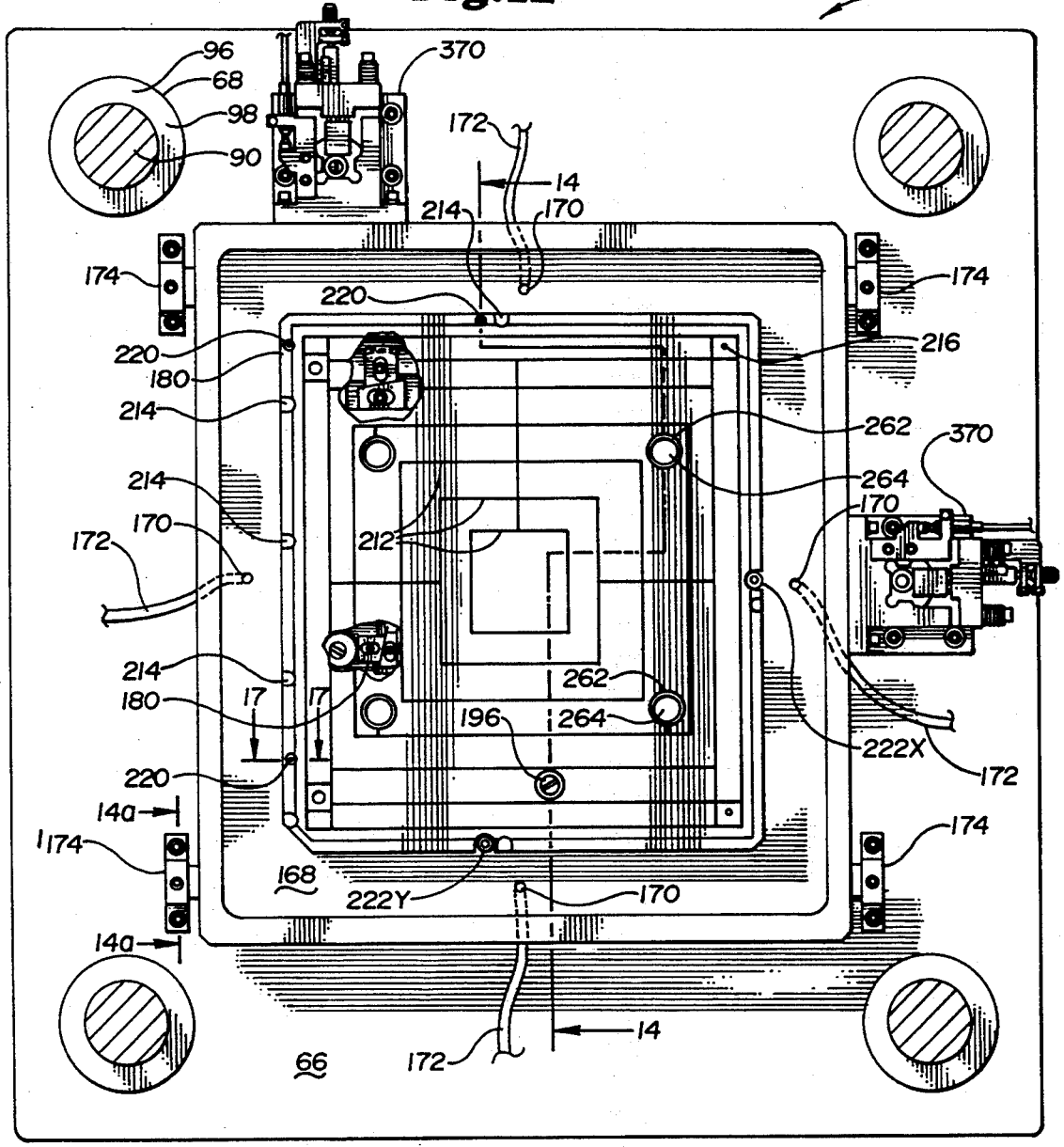
FIG. 12 is a upper perspective of the base plate and lower plate receiver with a portion broken out to show the detail of the dove tail locking system.

The automated liquid crystal display assembly machine is shown generally at 40. As used throughout the specification, the X and Y directions are in the horizontal plane oriented 90° with respect to one another. The Z direction is located in the vertical plane.

As depicted in FIGS. 1 and 2, automated LCD assembly machine 40 has a number of main components, that include main support structure 42, Z axis drive system 44, lower plate XY stage 46, upper plate positioning stage 48, XY driver system 50, and finally, ultraviolet glue curing system 52.

The main support structure 42 of automated LCD assembly machine 40 includes base 60. Base 60 in the preferred embodiment is a very substantial rectangular metallic piece that is supported on adjustable seismic isolators 62. There are three adjustable seismic isolators 62 oriented in a triangular form that are preferably adjusted at the time of installation of automated LCD assembly machine 40 in the facility in which automated LCD assembly machine 40 will be utilized.

Four upright support legs 64 are rigidly connected to base plate 60. Preferably, the support legs 64 are mounted very nearly perfectly at right angles to base 60. Support legs 64 are preferably oriented in a generally rectangular configuration on base 60.

Support legs 64 provide the support for lower plate block 66. Preferably, lower plate block 66 is rectangular in shape and constructed of a relatively massive metallic piece. lower plate block 66 is oriented perpendicular to support legs 64 and, accordingly, parallel to base 60.

Lower plate block 66 has two sets of bores therethrough, with each set preferably comprising four individual bores. The first set of bores, bearing bores 68, is located generally one at each corner of lower plate block 66. The bearing bores 68 are shown in phantom in FIG. 6. Bearing bores 68 are designed to closely receive a bearing of the Z-drive post, which will be later described. The second set of four bores in lower plate block 66 are loader bores 70. Loader bores 70 are designed to closely receive the bearings supporting the lower plate loader, which will be later described.

The final component of main support structure 42 is upper plate block 72. Upper plate block 72 is a massive metallic plate that is suspended above lower plate block 66. Preferably, upper plate block 72 is of generally the same dimensions in the X, Y planes as lower plate block 66. Upper plate block 72 has a preferably rectangular central aperture 74. Additionally, upper plate block 72 has four post bores 76 located generally at the four corners of upper plate block 72.

The Z-axis drive system 44 is the second main component of automated LCD assembly machine 40. The Z-axis drive system is depicted generally in FIGS. 1 and 2 and with more particularly in FIG. 6. The Z axis drive system 44 consists of four identical drive assemblies 80 located at each of the four corners of the base 60. Each drive assembly 80 that makes up the Z-axis drive system 44 has a upper portion 82 and a lower portion 84. It is important to understand that the upper portion 82 and the lower portion 84 are not physically joined, but are designed to be both vertically aligned and longitudinally joined by magnetic bearing 86. As such, the Z-axis drive system 80 bears a load in the Z dimension, but not in the X or Y dimensions.

Upper portion 82 of drive assembly 80 includes Z axis post 90. Z axis post 90 is a vertically moveable structural member. It is constructed of high strength metal and is of substantial diameter. At its upper most end, Z axis post 90 is threaded in order to cooperatively receive threaded nut 92. In assembly, upper bushing 94 is inserted in post bore 76 of upper plate block 72. Z axis post 90 is fitted within upper bushing 94 and nut 92 is threaded onto the upper end of Z-axis post 90, thus rigidly holding upper plate block 72 in position with respect to Z-axis post 90.

An elongated, cylindrical Z-axis post bearing housing 96 is closely held within bearing bore 68 of lower plate block 67. Upper bearing 98 and lower bearing 100 are included within Z-axis post bearing housing 96. Upper bearing 98 and lower bearing 100 are preferably ring bearings. Upper bearing 98 and lower bearing 100 are compressively held firmly in place within Z-axis post bearing housing 96. Upper bearing 98 and lower bearing 100 slideably engage Z-axis post 90, thereby holding Z-axis post 90 in an upright position while permitting Z-axis post 90 to translate in the Z direction as desired.

It should be noted that from adjustable seismic isolators 62 to the upper plate block 72, the structural integrity of the automated LCD assembly machine 40 is carried upward from base plate 60 through support legs 64. Support legs 64 structurally support lower plate 66. Lower plate 66 in turn transfers the structural integrity outward to the four Z-axis post bearing housings 96. Bearing housings 96 support the associated Z-axis posts 90, which in turn support the upper plate block 72.

The lower section of upper portion 82 of drive assembly 80 is a threaded, height adjusting lead 102. Height adjusting lead 102 is threaded into lead nut 104. Lead nut 104 has a castellated portion 106 to facilitate easy turning with a large wrench. Lead nut 104 further includes set screws 108 which can be turned in against height adjusting lead 102 to fix lead nut 104 in a desired position.

Stopper block 110 is threaded onto height adjusting lead 102 between lead nut 104 and the lower of bearing housing 96. Stopper block 110 has a plurality of upwardly tending adjustable stoppers 112. Adjustable stoppers 112 are preferably inserted through bores in stopper block 110 and held in place by nuts on either side of stopper block 110. Adjustable stoppers 112 are designed to come up against the underside of bearing housing 96 when drive assembly 80 is at its full upward travel.

Lower portion 84 of drive assembly 80 has two main components, gross adjusting pneumatic cylinder 120 and fine adjusting pneumatic cylinder 122. Gross adjusting pneumatic cylinder 120 is supported by cylinder support truss 124. Cylinder support truss 124 has a base 126. Base 126 is firmly affixed to base plate 60. Upwardly tending, columnar supports 128 are affixed to and project from base 126. Columnar supports 128 are arrayed typically in a square configuration of four such columnar supports 128. Gross adjusting pneumatic cylinder 120 is fitted within the four columnar supports 128.

Columnar supports 128 are affixed to and support upper bracket 129. Upper bracket 129 is preferably rectangular shaped and has central bore. Gross adjusting pneumatic cylinder 120 is affixed to the underside of upper piece 129. Upper bracket 129 has a plurality of adjustable stoppers 132 affixed thereto. Adjustable stoppers 132 limit the downward travel of drive assembly 80 by abutting the underside of cylinder flange 136 when drive assembly is in the retracted or lowered position.

Piston shaft 134 projects through the central bore of upper piece 129. The lower portion of piston shaft 134 comprises the piston of gross adjusting pneumatic cylinder 120 and therefore is the portion thereof that is raised or lowered, as desired. The full travel of piston shaft 134 is preferably approximately 12 inches. Piston shaft 134 is crowned with cylinder flange 136. In its retracted position, piston shaft 134 is withdrawn into gross adjusting pneumatic cylinder 120 and the underside of cylinder flange 136 contacts adjustable stoppers 132 to limit the downward travel. Cylinder flange 136 is preferably a cylindrical plate firmly affixed to the upper of piston shaft 134 and oriented at right angles to the longitudinal axis of piston shaft 134.

Fine adjustment pneumatic cylinder 122 is mounted on upper of cylinder flange 136. Fine adjustment pneumatic cylinder 122 operates in the Z axis and the travel of fine adjustment pneumatic cylinder 122 is limited to 0.4mm in the preferred embodiment. Fine adjustment pneumatic cylinder 122 has a piston 124 that is best shown in FIG. 7. Piston 124 operates in the Z direction responsive to pneumatic inputs to fine adjustment pneumatic cylinder 122.

As depicted in FIG. 7, magnetic bearing 86 magnetically joins upper portion 82 of drive assembly 80 and lower portion 84 of drive assembly 80. Magnetic bearing 86 has three major portions; lower ring magnet 140, ball bearings 142, and upper ring magnet 144. Lower ring magnet 140 is contained within upper recess 146 of socket bearing 148. Socket bearing 148 additionally has lower recess 150 that rotationally engages bearing face 132 of curved bearing cap 130. As depicted in FIGS. 8 and 9, bearing cap 130 is fixedly mounted on upper of piston 124 of fine adjustment pneumatic cylinder 122. Bearing face 132 forms the upper portion of bearing cap 130. Bearing face 132 is curved to permit limited rotational motion about bearing face 132. The upper wall of lower recess 150 is a bearing face that engages bearing face 132 in rotational freedom. FIGS. 8 and 9 show, in exaggerated form, magnetic bearing 86 accommodating the lateral misalignment of the top portion 82 and the bottom portion 84 of drive assembly 80. The lateral misalignment results in the rotational effects depicted.

Upper ring magnet 144 is contained within recess 154 in lead nut 104. Upper recess 146 in socket bearing 148 and recess 154 in lead nut 104 are both ring shaped recesses and closely accommodate lower ring magnet 140 and upper ring magnet 144, respectively. A plurality of hardened steel ball bearings 142 are distributed equiangularly around and between lower ring magnet 140 and upper ring magnet 144. Ball bearings 142 are distributed equiangularly by magnetic forces and are also held in place by magnetic forces as depicted in FIG. 10.

The poles of lower ring magnet 140 and upper ring magnet 144 are indicated by the letters N and S on each of magnets 140, 144. The magnetic field generated by such orientation of the poles is as indicated in FIG. 11. There are effectively two magnetic forces exerted when lower ring magnet 140 and upper ring magnet 144 are brought close to each other. The first such magnetic force evenly distributes ball bearings 142 radially about lower ring magnet 140 and upper ring magnet 144 as indicated in FIG. 10. Additionally, as indicated in FIG. 11, ball bearings 142 will be displaced an equal radial distance from the inside radius and the outside radius of the respective ring magnets by this same magnetic force.

The second magnetic force that is present is the force of attraction between lower ring magnet 140 and upper ring magnet 144. This force of attraction does two things. First, it attracts upper portion 82 and lower portion 84 of drive assembly 80 toward one another. Secondly, this force resists the axially displacement of upper portion 82 and lower portion 84 of drive assembly 80. The magnetic effects on the ball bearings 142 shown in FIGS. 10 and 11 are shown with respect to lower ring magnet 140. The same effects exist for upper ring magnet 144.

Lower plate XY stage 46 is best shown in FIGS. 12 and 14. Lower plate XY stage 46 has three main components, lower plate block 66, traverse table 160 and vacuum chuck 162. Traverse table 160 is supported on lower plate block 66 by four magnetic bearings 164. Magnetic bearings 164 operate in a similar fashion to the previously described magnetic bearing 86. As such, there is no restraining physical connection between lower plate block 66 and traverse table 160. A moderately hard push on traverse table 160 would overcome the magnetic force of attraction exerted by the four magnetic bearings 164, and traverse table 160 would be dislodged from base plate 66.

Magnetic bearing 164 provides a lubrication free and virtually frictionless connection between base plates 66 and traverse table 160. The fact that it is lubrication free is important to the production of the finest quality of LCD displays. Such displays are produced in "clean room" environments. In these environments, it is detrimental to maintaining the desired degree of cleanliness to have materials present in the room to which dirt and other debris readily adheres. Greases and other petroleum based lubricants readily entrain airborne debris.

The centering magnetic forces, as previously described with reference to magnetic bearing 86, tend to keep traverse table 160 in a fixed location on lower plate block 66. The centering magnetic forces of magnetic bearings 164 resist forces applied to traverse table 160 in the X, Y directions. The attractive magnetic forces hold the traverse table 160 to lower plate block 66 and resist forces in the Z direction that would separate traverse table 160 from lower plate block 66.

There is a need to not only support traverse table 160 from underneath with support bearings 164, but also to restrain the table 160 from any upward Z motion, as well as yaw, or pitch motions with respect to base plate 66. Applying vacuum to the space between the two glass plates 226, 306 (during the curing process) generates a significant upward force on the traverse table 160.

This force would lift the traverse table 160 off the support bearings 164 and disturb the alignment between the two glass plates 226, 306 if the table was not restrained by some means. The lock bearings 174 provide the ability to lock the traverse table 160 down to lower plate block 66 and restrain it from any Z, yaw, and pitch motion while at the same time facilitating both X and Y motion by means of magnetic bearing 175.

The lock bearing 174 forms, with the support bearing 164, a double acting bearing. The purpose of both sets of bearings is to act cooperatively to restrain the traverse table 160 from any Z, yaw, or pitch motion. There are four support bearings 164 and four lock bearings 174.

The lock bearing 174 consists of a magnetic bearing 175, a housing 176, a set screw 177, and a magnet 179. The magnetic bearing 175 operates in a similar fashion to the previously described magnetic bearing 86. The support 178 is mounted to the underside of traverse table 160, and the housing 176 is mounted to the lower plate block 66. Effectively, this arrangement "locks" the traverse table 160 to the lower plate block 66.

The lock bearings 174 are located next to the support bearings 164 (see FIGS. 14 and 25). Adjusting the set screw 177 inward and pushing the magnet 179 down generates a pre-load on the bearing 175. This pre-load is forwarded to the support 178, which in turn pushes the traverse table 160 down to create a pre-load on support bearing 164. With one set of bearings (one support bearing 164 and one lock bearing 174) at each corner of traverse table 160, the traverse table 160 is restrained from any Z, yaw, or pitch motion.

There is a second purpose for the need of lock bearings 174. The rapid separation of the upper plate positioning stage 48 from the lower plate XY stage 46 (after completion of the display assembly process) generates a vacuum in the recess 168 between the vacuum seal 320 and the lower traverse table 160 (see FIGS. 14 and 25). This vacuum would cause the lower traverse table 160 to be lifted off the support bearings 164 and to be lifted upwards together with the upper plate positioning stage 48. The lock bearings 174 function to prevent this from occurring.

In the preferred embodiment, traverse table 160 is effectively tray shaped, having an internal section that is machined out, leaving upturned edges 166. The upturned edges 166 of traverse table 160 are best viewed in FIG. 14. The upturned edges 166 define a central recess 168 within traverse table 160. In the preferred embodiment traverse table 160 and central recess 168 are rectangular in shape and of sufficient dimension to accommodate the desired LCD glass plate within central recess 168. It will be recognized, however, that traverse table 160 and recess 168 can be of any shape necessary to accommodate the desired LCD glass plate.

A plurality of vacuum ports 170 are arrayed close to the outer periphery of recess 168. Vacuum ports 170 are connected to a vacuum manifold (not shown) within traverse table 160. The vacuum manifold is connected by suitable tubing 172 to machinery suitable for drawing a vacuum. The apparatus for creating a sealed space to be evacuated and the utilization of such vacuum system will be later detailed.

Vacuum chuck 162 is disposed within recess 168 of traverse table 160. A gap is left between vacuum chuck 162 and the edges of recess 168 so that vacuum chuck 162 may be accurately positioned within recess 168 and to accommodate seal retainer block 322 when the upper plate positioning stage 48 is in the lowered position. This position is best depicted in FIG. 25 and is later described in more detail. Vacuum chuck 162 is positioned and held in place within recess 168 by dove tail lock downs 180.

Figure 13:
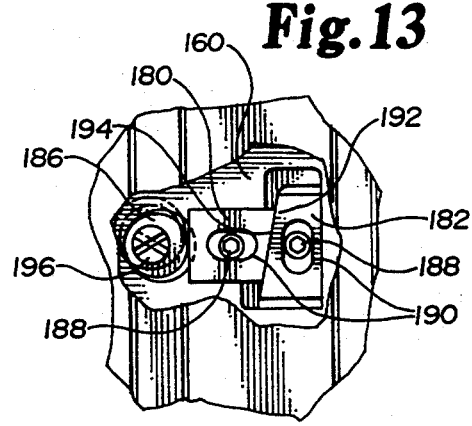
FIG. 13 is a perspective of the dove tail locking system taken along circle 13 of FIG. 12.

As depicted most clearly in FIG. 13. dove tail lock downs 180 have three main components; position adjusting block 182, locking block 184 and camreed lock 186. Position adjusting block 182 and locking block 184 are slideably connected to traverse table 160 by pins 188. Pins 188 operate in race track slots 190. Meeting faces 192, 194 of position adjusting block 182 and locking block 184 respectively, are cut at complimentary angles, which angles are acute or obtuse with respect to the longitudinal axis of race track slots 190. The effect of the angled meeting faces 192, 194 is that by transverse motion of the angled meeting faces 192, 194 with respect to the longitudinal axis of the race track slots 190, vacuum chuck 162 can be moved either way along the direction of the longitudinal axis of slot 190 in locking block 184 and yet locking block 184 will remain closely in contact with cammed lock 186. Locking block 184 must remain in close contact with cammed lock 186 in order to effect the locking function of locking vacuum chuck 162 to traverse table 160.

Cammed lock 186 is put in the locked or unlocked position by screw 196 which projects into an aperture in vacuum chuck 162 and can be operated while vacuum chuck 162 is in place on traverse table 160. The meeting faces 198, 200 of locking block 184 and cammed lock 186 are cut at complimentary angles such that when cammed lock 186 is rotated into the locked position, meeting face 200 underlies a portion of meeting face 192 of locking block 184 and thereby holds vacuum chuck 162 firmly in place in traverse table 160.

Returning again to FIG. 14, the upper surface 210 of vacuum chuck 162 is a closely toleranced surface to provide a virtually flat support for the lower glass plate 226 of the LCD display. Upper surface 210 is scored with a series of interconnecting vacuum grooves 212. The interconnecting pattern of grooves is depicted in FIG. 12. Detail of vacuum grooves 212 is shown in FIG. 15.

A series of recesses 214 are milled in the periphery of vacuum chuck 162 to accommodate a series of upper banking pins 342. Two alignment sights 216 are included in the vacuum chuck 162. Alignment sights 216 function as a portion of the fine alignment system 50 as will be later explained.

Referring to FIG. 12, a series of banking pins 220, 222 are employed to ensure that the lower glass plate 226 is accurately pre-aligned on vacuum chuck 162. Preferably there are three stationary banking pins 220 and two adjustable banking pins 222x and 222y. Two of the stationary banking pins 220 are located along one side of vacuum chuck 162 and the third stationary banking pin 220 is located along an adjacent side of vacuum chuck 162. The two adjustable banking pins 222x, y are disposed on the other two adjacent sides of vacuum chuck 162, so that the adjustable banking pins 222x, y each oppose at least one stationary banking pin 220.

The design of the stationary banking pins 220 is as shown in FIG. 17. Banking pin 220 is located within recess 224 in vacuum chuck 162. Banking pin 220 is designed to abut against the edge of lower glass plate 226. The Z axis dimension of banking pin 220 is adjusted by turning screw 228 into or out of threaded bore 230 in vacuum chuck 162. It is desired-that, as lower glass plate 226 is adjusted laterally with respect to banking pin 220, there be no sliding friction generated at the juncture of the edge of glass plate 226 and banking pin 220. Accordingly, the banking pin head 232 is coupled to the screw head 228 by ball bearings 234. This coupling permits banking pin head 232 to freely rotate about screw head 228 responsive to the motion of lower glass pate 226 as lower glass plate 226 is laterally adjusted, thereby preventing the buildup of friction between lower glass plate 226 and screw head 228.

As shown in FIG. 16, adjustable banking pin 222 includes a banking pin 234 that is similar in design to a stationary banking pin 220, except that instead of being threaded into vacuum chuck 162, the banking pin 234 is threaded into adjustable arm 236. Adjustable arm 236 is connected to the piston 238 of a pneumatic drive unit 240. Pneumatic drive unit 240 is capable of bi-directional motion as indicated by the two headed arrow in FIG. 16. Pneumatic drive unit 240 is located beneath vacuum chuck 162, with the adjustable banking pin 234 projecting upwards to contact the edge of lower glass plate 226. As shown in FIG. 16, lower glass plate 226 overlies vacuum chuck 162.

Referring again to FIG. 14, the final feature of lower plate XY stage 46 is the lower plate loader 246. Loader 246 is a pneumatically operated device that is capable of raising above the level of vacuum chuck 162 to receive the lower glass plate 226 and to lower glass plate 226 into position on upper of vacuum chuck 162. To accomplish this, loader 246 includes an air cylinder 248 that is affixed at one end to the underside of lower plate block 66. At the other end of air cylinder 248, piston 250 is connected to the center of loader base plate 252. Loader base plate 252 is preferably a square plate. At each corner of loader base plate 252 is upwardly tending loader post 254.

A bearing holder 256 is located in each of the four bearing bores 70 in base plate 66. Located centrally within each bearing holder 256 is a bearing pair comprising an upper and lower bearing 258, 259. Each loader post 254 projects through respective bearings 258, 259. A bore 260 in traverse table 160 and a bore 262 in vacuum chuck 162 are located in registry with the four bearing bores 70 in base plate 66. Loader posts 254 continue upward through bore 260 in traverse plate 160 and bore 262 in vacuum chuck 162. The bores 260, 262 are in registry with one another.

Each of the four loader posts 254 is capped with a suction cup 264. The operating suction for the four suction cups 264 is drawn through the hollow center of loader posts 254. Loader posts 254 are capable of being raised above the upper surface of vacuum chuck 162 as shown in phantom in FIG. 14. In the raised position suction cups 264 are designed to receive lower glass plate 226 and to lower it into position on vacuum chuck 162.

The next major element of automated LCD assembly machine 40 is upper plate positioning stage 48. Upper plate positioning stage 48 is best viewed in FIGS. 20, 21 and 24. The main components of upper plate positioning stage 48 are upper traverse table 270 and upper chuck 272.

Central aperture 74 of upper plate block 72 is formed with a horizontal shelf 271. Traverse table 270 is formed to ride on and be supported by the horizontal shelf 271 of central aperture 74. The dimensions of traverse table 270 are somewhat less than the dimensions of central aperture 74 so that there is a desired amount of play in the X, Y directions between traverse table 270 and aperture 74. Magnetic bearings 274 are interposed between traverse table 270 and the horizontal shelf 271 of upper plate block 72. Magnetic bearings 274 are similar in design and function of the previously described magnetic bearings 86. Magnetic bearings 274 provide a virtually frictionless interface between traverse table 270 and upper plate block 72. Additionally they provide a centering force that tends to keep traverse table 270 centered in registry with central aperture 74 of upper plate block 72.

Traverse table 270 has a central aperture 276 that like central aperture 74, has a horizontal step 277. Upper chuck 272 is designed to be disposed in central aperture 276 and to rest on the horizontal shelf 277 of central aperture 276. The Z axis relationship between upper chuck 272 and traverse table 270 is determined by set screws 280 that bear on the surface of shelf 277. Set screws 280 are adjusted in height to achieve the proper Z height spacing.

The X, Y relationship between chassis 278 and traverse table 270 is fixed by flexures 282 arrayed along two of the adjacent sides of the upper chuck 272. Flexures 282 are mounted at one end to traverse table 270 by studs 284 and at the other end to upper chuck 272 by studs 284. As previously indicated, flexures 282 fix the X, Y relationship between upper chuck 272 and traverse table 270 yet, by being flexible and by being arrayed along only two sides of upper chuck 272, flexures 282 permit a desired, limited amount of motion of upper chuck 272 in the Z plane. Such motion is indicated by the phantom lines and arrows 476 depicted in FIG. 24. Flexures 282 are preferably made of beryllium copper for the properties of having a zero coefficient of expansion and being relatively stiff, yet retaining a certain flexibility.

Upper chuck 272 includes upper loader 290. The best depiction of the details of upper loader 290 is in FIG. 23, while the relationship of upper loader 290 to the overall LCD assembly machine 40 is best seen in FIG. 25. Upper loader 290 includes support struts 292 extending from each of the sides of upper chuck 272. Supports 292 support a gantry 294. Gantry 294 is positioned in the Z dimension by supper screws 296 that are threaded through a portion of support struts 292. Depending from gantry 294 are a plurality of air cylinders 298. Flexible pneumatic lines 300 are connected to air cylinders 298 to provide the motive of power to actuate air cylinders 298.

The pistons 301 of air cylinders 298 depend upward and are connected to gantry 294. The gantry 294 is connected to suction cups 302. The suction in suction cups 302 is applied by flexible pneumatic line 304. The suction cups 302 are designed to receive and adhere to the upper side of upper plate 306. After such adherence, extension of pistons 301, draws upper plate 306 upward into position against the under side of upper chuck 272. The range of motion of suction cups 302 is shown by the phantom lines in FIG. 23.

A plurality of vacuum stations 310 are located around the periphery of upper chuck 272. Vacuum stations 310 are affixed to vacuum chuck 272 by threaded bolts 312. Vacuum stations 310 depend downward from upper chuck 272 and have a downward facing vacuum opening 314. Vacuum openings 314 apply a vacuum to the upper side of upper plate 306, thereby holding upper plate 306 in place after upper plate 306 has been positioned on the under side of vacuum chuck 272.

Upper plate positioning stage 48 additionally includes vacuum seal 320. Vacuum seal 320 is best viewed in FIGS. 20 and 24. Vacuum seal 320 is generally rectangular in shape and overlaps the interface between upper plate 306 and lower traverse table 160. Vacuum seal 320 is constructed of flexible material and is designed to create an air tight seal between the surfaces of lower glass plate 226 and upper glass plate 306 that are facing one another.

Vacuum seal 320 is held in place by seal retainer block 322 on its lower side and seal retention flange 324 on its upper side. Seal retention flange 324 is carried by connection pilar 326. Connection pillar 326 is tubular in cross section having an outside diameter that is less than bore 332 in upper plate 72 and an inner diameter that is large enough to receive bolt 330 therethrough. Sealing O rings 328 are included at both the upper of connection pillar 326 at the juncture with traverse table 270 and at the lower face of connection pillar 326 at the interface with seal retainer block 322 to create an air tight seal at this point.

Bolt 330 passes through seal retainer block 322 and connection pillar 326 and is threaded into threaded bore 334 in traverse table 270. It should be noted that in this manner, vacuum seal 320 is kept spaced apart from upper plate block 72 and is carried solely by traverse table 270. Seal retention flange 324 spaces seal 320 apart from upper plate block 72 in the Z direction and connection pillar 326 spaces vacuum seal 320 apart from upper plate blocks 72 in the X and Y directions.

Another feature of upper plate positioning stage 48 is the banking pin system. Like lower plate XY stage 46, upper plate positioning stage 48 has both fixed and moveable banking pins. Both the fixed banking pins 340 and adjustable banking pins 342 are contained in housings 346 formed within seal retainer block 322 as shown in FIG. 24. The banking pins 340, 342 are directed inward from seal retainer block 322 and upward to contact and position upper plate 306.

Detailed design of the fixed banking pin 340 is shown in FIG. 22. Banking pin head 343 is designed in a manner similar to the banking pin head 232 shown in FIG. 17. As such, banking pin head 343 is mounted on ball bearings for freedom of rotation in the X, Y planes. The body 344 of fixed banking pin 340 is inserted in housing 346 in seal retainer block 322. Body 344 is positionable in the Z axis by threaded stop screws 348. Body 344 is positionable in the X or Y plane, as appropriate by screw 350.

In the preferred embodiment there are two upper adjustable banking pins 342. One adjustable banking pin 342x positions upper glass plate 306 in the X plane and the other adjustable banking pin 342y adjusts upper glass plate 306 in the Y plane. The upper adjustable banking pins 342x, y are best shown in FIGS. 18 and 19. Adjustable banking pin 342 has two pneumatic cylinders 352. Two pistons 354 that are connected to cylinders 352 are joined to a common cross member 356. The two pistons 354 operate in unison to move cross member 356 in either the X or Y plane, as consistent with the orientation of the specific adjustable banking pin 342. Adjustable arm 358 is connected to cross member 356. Banking pin head 360 projects upward from the adjustable arm 358 and moves with cross member 356 in either the X or Y direction, as consistent with the orientation of the specific adjustable banking pin 342.

Pneumatic lines 362 provide power to cylinders 352 and to position pistons 354. Adjustable banking pins 342 are affixed to seal retainer block 322 by threaded screws 364.

Figure 33A:
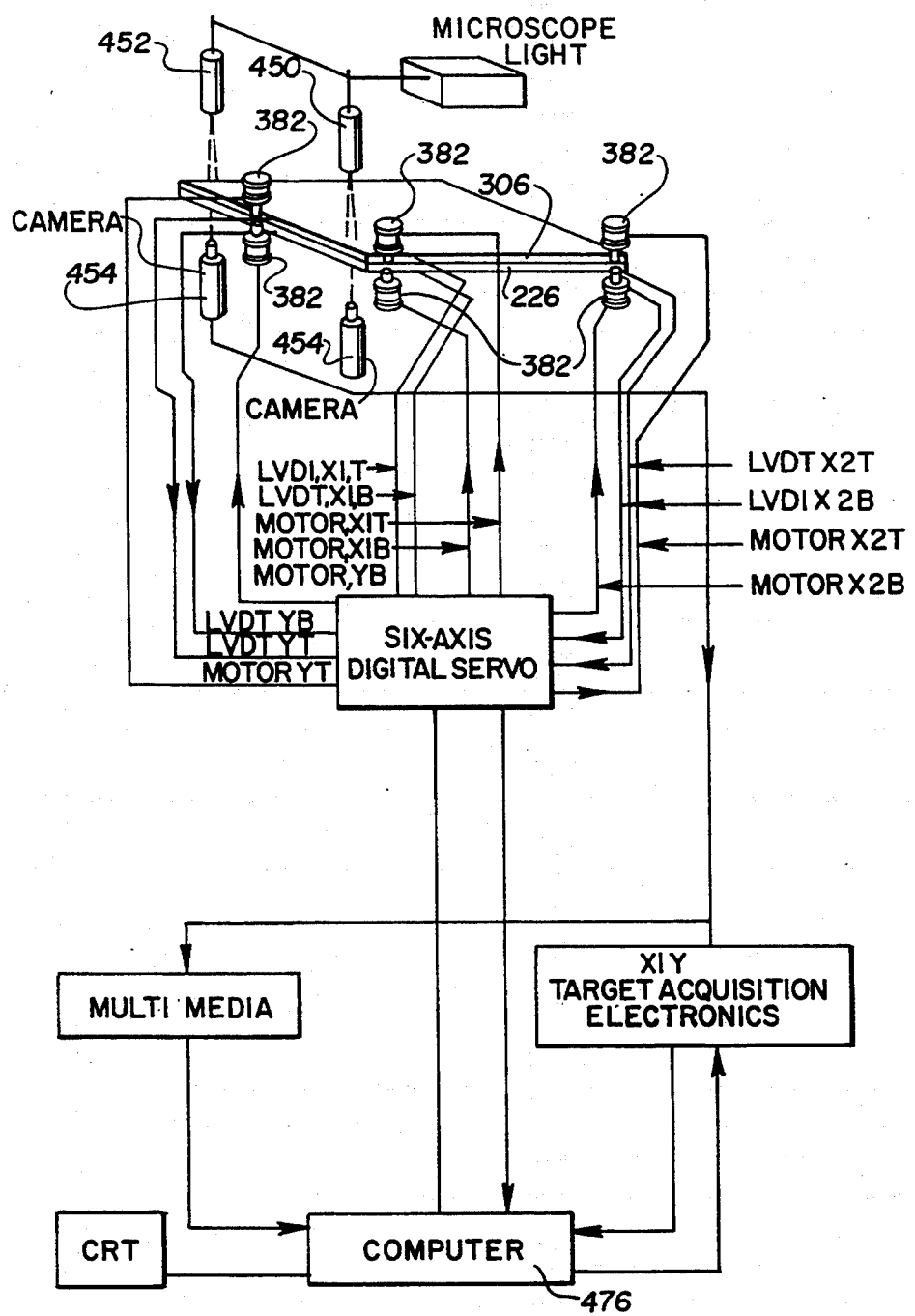
FIG. 33a is block diagram of the alignment loop of the system.

The fine alignment system 50 consists of three major components, traverse adjusters 370, fiberoptic system 372 and the computer, shown schematically in FIG. 33a. The alignment technique is covered by U.S. Pat. No. 4,475,122, assigned to the same assignee as the present application and included herein by reference.

There are six traverse adjusters 370 utilized in automated LCD assembly machine 40. Three are utilized with the lower traverse table 160 and three are utilized with the upper traverse table 270. The fine alignment system 50 is utilized to accurately and extremely finely adjust the respective traverse tables 160, 270 in the X and Y planes with respect to the respective base plates 66, 72 during the final stages of manufacturing the LCD display.

Figure 26:
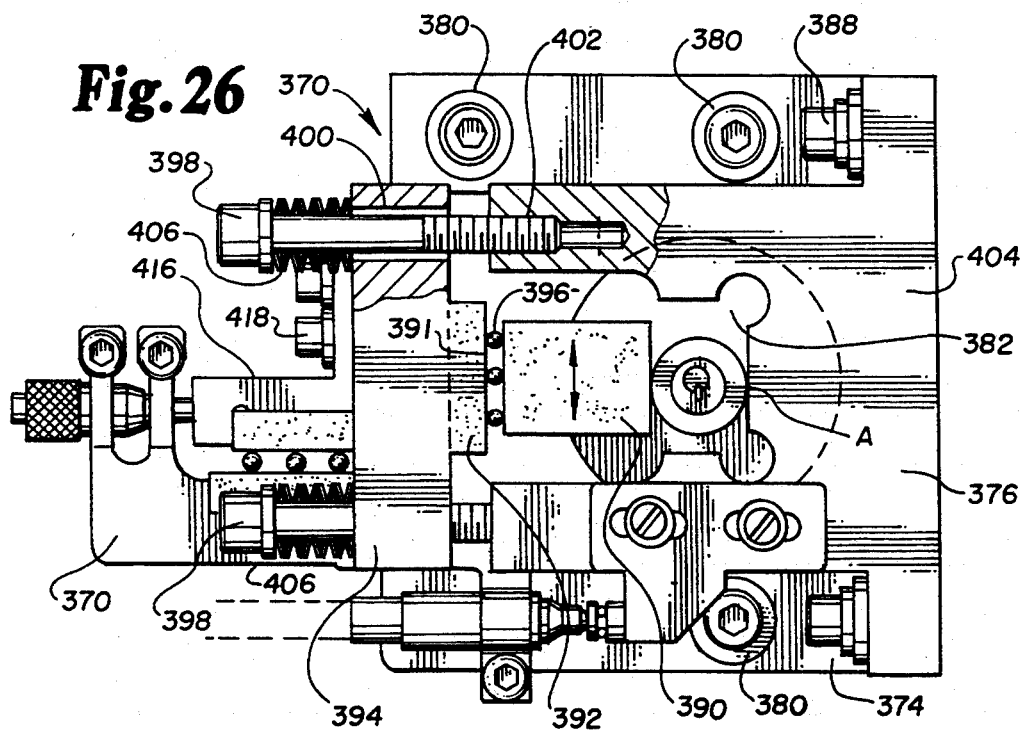
FIG. 26 is a upper perspective of the traverse adjuster.
Figure 27:
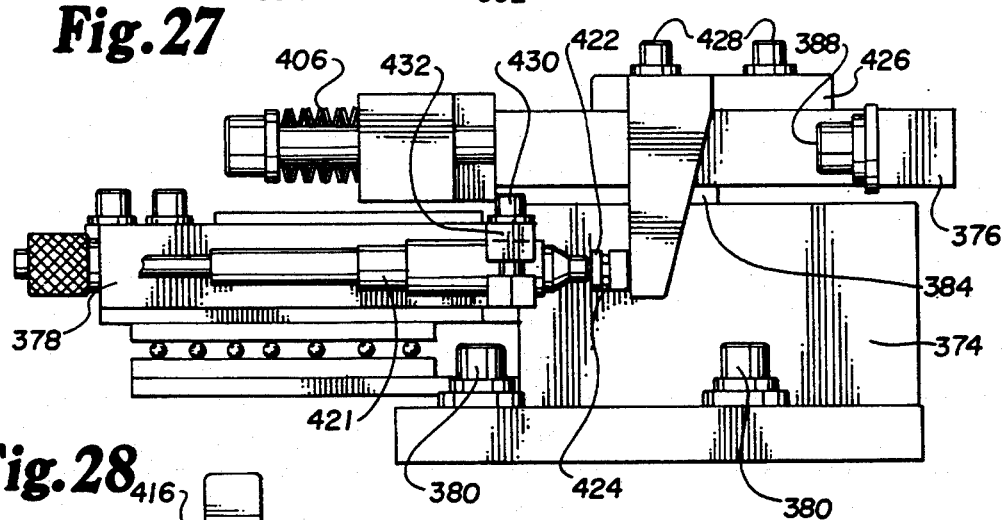
FIG. 27 is a side perspective of the traverse adjuster.

As shown in FIGS. 26 and 27, traverse adjusters 370 have three main portions; the base portion 374, the traversing portion 376, and the measurement section 378. The base portion 374 is firmly affixed to either the lower plate block 66 or the upper plate block 72, as appropriate depending on which of traverse tables 160, 270 the specific traverse adjuster 370 is intended to function with. Accordingly, threaded bolts 380 are threaded into threaded bores within lower plate block 66 or upper plate block 72 and affix base portion 374 thereto. Traversing portion 376 is likewise firmly affixed to the corresponding lower traverse table 160 or upper traverse table 270 as desired. Threaded bolts 388 pass through a bore in traversing portion 376 and are threaded into a threaded bore within lower traverse table 160 or upper traverse table 270, as desired.

Effectively, the base portion 374 and traversing portion 376 of the traverse adjuster 370 are independently mounted such that base portion 374 and traversing portion 376 are in registry but with no fixed connecting means therebetween. Base portion 374 is affixed to the associated plate block 66 or 72 and the corresponding traversing portion 376 is affixed to the associated traverse table 160 or 270. Servo motor 382 provides the motive interaction between the base portion 374 and the traversing portion 376. Servo motor 382 is fixedly mounted within base portion 374. Servo motor 382 is connected by servo motor shaft 384 to cammed actuator 386, positioned within traversing portion 376.

Traversing portion 376 includes a magnetic adjusting block 390. Adjusting block 390 is coupled to traversing portion 376 by a magnetic bearing 391. Adjusting block 390 comprises a magnet. An opposing ring magnet 392 is included in tension block 394. Ball bearings 396 are magnetically disposed between the two magnets, ring magnet 392 and magnetic adjusting block 390. Adjusting block 390 is free to move transversely in the direction of motion of traversing portion 376 responsive to the rotary motion of cammed actuator 386 in order to minimize friction between actuator 386 and adjusting block 390. As previously indicated, magnetic bearing 391 provides an essentially lubrication-free, frictionless joint that virtually eliminates any friction forces between base portion 374 and traversing portion 376 as traversing portion 376 is moved relative to base portion 374 It should be noted that the only point of contact between base portion 374 and traversing portion 376 is at the point where cammed actuator 386 rides on adjusting block 390 and at point A, as shown in FIG. 26.

Tension block 394 is slideably mounted on bolts 398. Bolts 398 pass through a bore 400 in tension block 394.

Bore 400 has an inside diameter substantially greater than the outside diameter of bolts 398 such that tension block 394 freely slides back and forth on bolts 398. Bolts 398 are threaded into threaded bores 402 in traverse frame 404. Coil springs 406 are slipped over bolts 398 and are interposed between the head of bolt 398 and tension block 394. Springs 406 are normally held in compression against adjusting block 390. Thus, springs 406 force traverse frame 404 by into contact with cammed actuator 386. As previously indicated, lower traverse table 160 is supported on lower plate block 66 by magnetic bearings 164. Similarly, upper traverse table 270 is supported on upper plate block 72 by magnetic bearings 274. Magnetic bearings 164, 274 exert a centering force that tends to keep lower traverse table 160 and upper traverse table 270 in a fixed, centered position. When displaced from this fixed position, magnetic bearings 164, 274 exert an opposing force tending to pull the respective lower traverse table 160 or upper traverse table 270 back to the fixed position. This centering force opposes the force of springs 406 acting on traverse frame 404.

Figure 29:
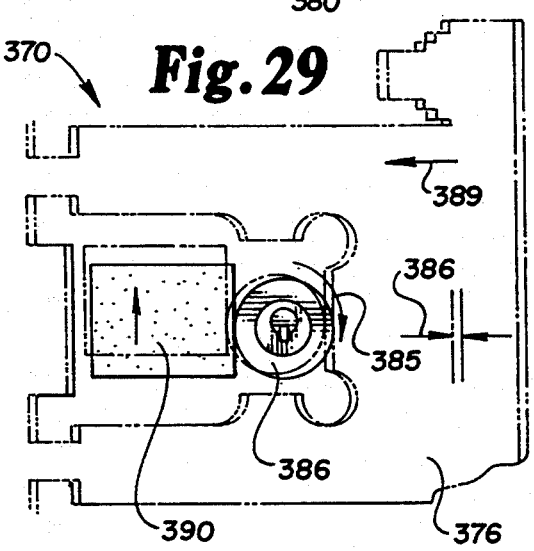
FIG. 29 is a upper perspective of the cammed actuator in motion against the adjusting block of the traverse adjuster.
Figure 30:
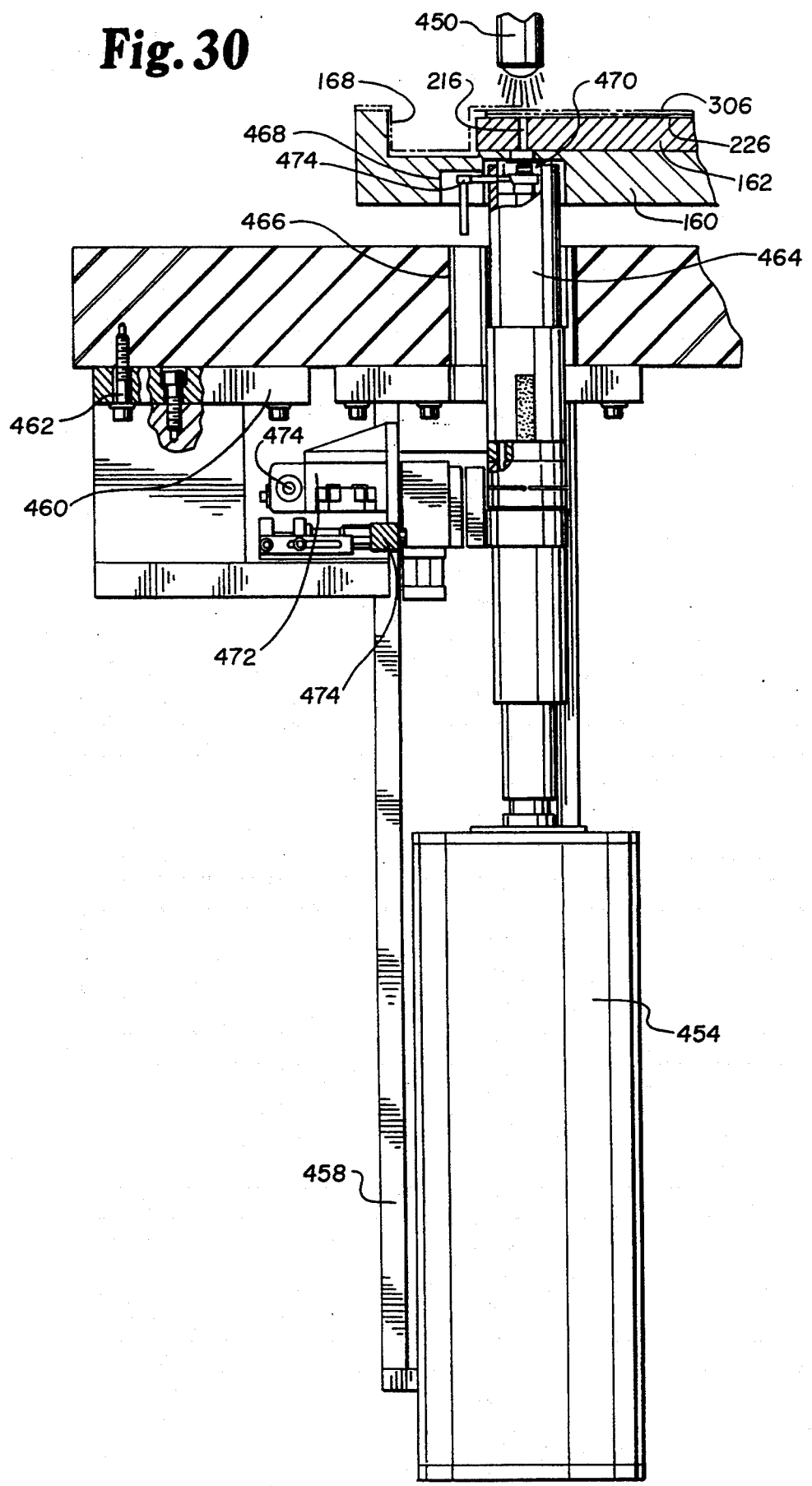
FIG. 30 is a side perspective sectional view of the video alignment system.
Figure 31:
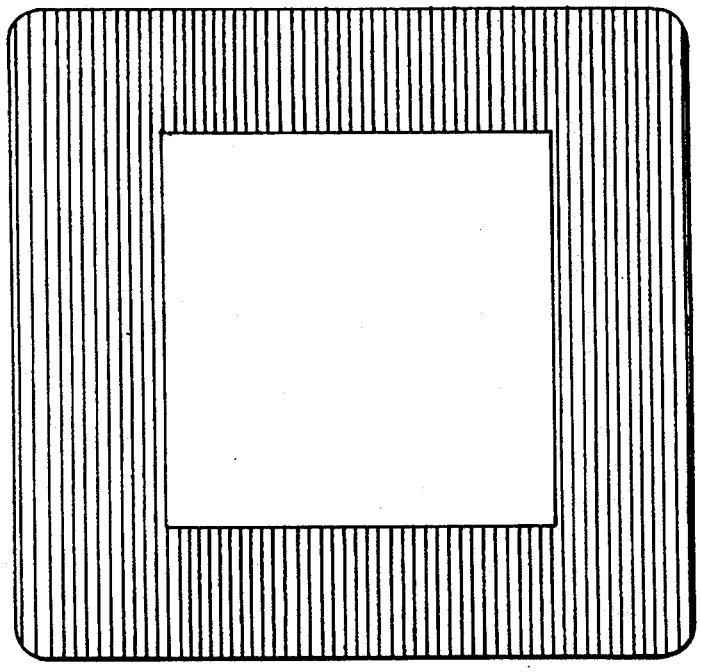
FIG. 31 is a depiction of the video target of the lower plate.

In FIG. 26, cammed actuator 386 is shown in its neutral position. Cammed actuator 386 rotates about pin 408 a total of 180°, 90° in either direction from the shown neutral position to bring the high point or the low point of the cam into contract with traversing portion 376. The high point and low point are the limits of travel that cammed actuator 386 is capable of effecting in traversing portion 376. From the position shown in FIG. 26 rotation of cammed actuator 386 ninety degrees in a counterclockwise direction results in motion of traversing portion 376 to the right with respect to base portion 374. Clockwise rotation of cammed actuator 386 is shown in FIG. 29. As shown, clockwise rotation of cammed actuator 386 moves traversing portion 376 to the left with respect to base portion 374. This motion is shown by the arrows superimposed on the phantom outline of traversing portion 376. It is intended that such motion be accomplished with the generation of as little friction as possible. Accordingly, adjusting block 390 is free to move transversely as indicated by the arrow in FIG. 26 responsive to the rotation of cammed actuator 386. Ball bearings 396 provide a substantially frictionless motion, so that cammed actuator 386 does not have to slide in contact with adjusting block 390, but is in rolling contact with adjusting block 390.

Figure 28:
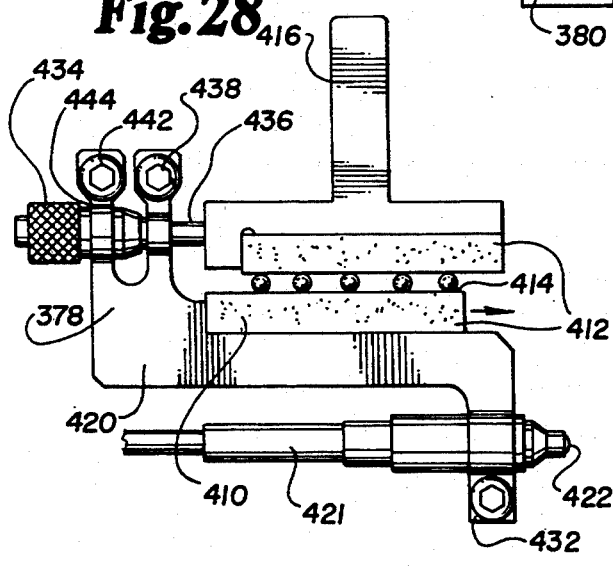
FIG. 28 is a upper perspective of the measurement section of the traverse adjuster.

Referring to FIG. 28, measurement section 378 is included to provide information to the computer as to the amount of travel that remains in either direction for traversing portion 376 until the maximum is reached at 90° of rotation of cammed actuator 386. It should be noted that measurement section 378 is not physically connected to either base portion 374 or traversing portion 376. Measurement section 378 is held in place by magnetic bearing 410. One of opposed magnets 412 is included in bracket 416. Bracket 416 is firmly affixed to base portion 374 by threaded screws 418. The second opposed magnet 412 is included in measurement frame 420. Ball bearings 414 are interposed between the two opposed magnets 412 and magnetically held in place. As depicted in FIG. 28, magnetic bearing 410 is off set from center such that the centering force inherent in magnetic bearing 410 constantly tends to pull measurement section 378 to the right as indicated by the arrow.

As depicted in FIG. 27, linear voltage differential transducer (LVDT) 421 is included to provide feedback to the computer of the travel of traversing portion 376 with respect to base portion 374. Sensor tip 422 of LVDT 421 is brought into contact with anvil 424. Anvil 424 is affixed to anvil mount 426. Anvil mount 426 is in turn firmly affixed to traversing portion 376 by threaded screws 428. Contact between sensor tip 422 and anvil 424 is maintained by the previously described centering force of magnetic bearing 410, indicated by the arrow in FIG. 28. LVDT 421 is held in place by the threaded screw acting through clamp 432 which is affixed to measurement frame 420.

The motion of traverse adjusters 370 is as depicted in FIG. 29. The servo motor 382 rotates cammed actuator 386 as indicated by arrow 385. This rotation causes the traverse adjuster to translate a distance as indicated by arrows 387 in the direction as indicated by arrow 389. In order to minimize the buildup of undesirable friction in the system, adjusting block 390 translates as indicated on magnetic bearing 391.

Micrometer head 434 is utilized to set LVDT 421 so that sensor tip 422 is at midrange of the limits of travel of micrometer head 434 when cammed actuator 386 is in the neutral position. By rotating micrometer head 434, micrometer shaft 436 is lengthened or shortened as appropriate. Such lengthening of shortening causes sensor tip 422 to come gently into contact with anvil 424. Once LVDT 421 is correctly positioned with respect to anvil 424, screw 438 is tightened, thereby tightening clamp 440 on micrometer shaft 436. Micrometer head 434 is held in place by screw 442 acting through clamp 444. Sensor tip 422 is maintained in contact with anvil 424 by the centering magnetic force of magnetic bearing 410 throughout either clockwise or counter-clockwise rotation of cammed actuator 386, in order to provide data to the computer on how much lineal adjustment authority is remaining with cammed actuator 386.

The video alignment system 372 works in conjunction with the traverse adjusters 370 to provide positional information on the relative positions of upper glass plate 306 and lower glass plate 226 that is input to the computer and with which the computer generates servo commands to actuate the cammed actuator 386. Operation of the video alignment system 372 is in accordance with U.S. Pat. No. 4,475,122. The video alignment system 372 has three main components; illuminator 450, alignment sight 452, and camera 454. Two illuminators 450 are utilized. They are mounted in bores in upper chuck 272. Illuminators 450 are so oriented as to direct a beam of light downward. The mounting of illuminators 450 is best shown in FIGS. 24 and 25.

The beam of light generated by illuminators 450 is projected first through upper glass plate 306 and then through lower glass plate 226. As will be explained later, etchings on upper glass plate 306 and lower glass plate 326 are utilized to indicate proper alignment.

Alignment sight 216 is mounted in a recess in vacuum chuck 162. Alignment sight 216 transmits the illuminated images from upper glass plate 306 and lower glass plate 226 through vacuum chuck 162. The image is then passed through aperture 456 in traverse table 160 to be captured by camera 454.

Camera 454 is an elongated unit that is mounted to base block 66. Camera frame 458 is connected to mounts 460. Mounts 460 are in turn bolted securely to base plate 66 by bolts 462. The output of camera 454 is directed to the computer and provides information to the computer on the relative alignment of upper glass plate 306 and lower glass plate 226.

Camera 454 is supported solely through base plate 66 so that camera 454 remains in alignment with base plate 66. The structure of the microscope 464 portion of camera 454 projects through bore 466 in base plate 66. Bore 466 has an inside diameter that is substantially greater than the outside diameter of microscope 464, thereby permitting adjustment of microscope 464 in the X, Y, and Z planes.

Aperture 456 opens into cavity 468 formed in traverse table 160. Microscope head 470 projects into cavity 468. Microscope head 470 is accurately aligned with alignment site 216 by alignment apparatus 472. Alignment apparatus 472 has micrometer heads 474 to align and fix in place camera 454 with respect to alignment site 216. Such alignment is effective to the X and Y planes. The Z axis adjustment of microscope head 470 is accomplished by motion in the Z axis and locking in place by locking screw 474 which can be manually locked after the Z axis dimension of microscope head 470 is achieved.

The final system necessary to produce LCD displays is the ultraviolet glue curing system 52. The glue used to cement upper glass plate 226 and lower glass plate 306 together is ultraviolet sensitive and cures in the presence in ultraviolet radiation. The ultraviolet glue curing system 52 is mounted on upper of plate block 72 and is directed such that, when activated, glue curing system 52 projects ultraviolet radiation through upper glass plate 306 to affect glue strips interposed between upper glass plate 306 and lower glass plate 226. The glue curing system 52 is conventional and it is believed that no further description is necessary to those skilled in the art.

In operation, production of LCD displays in an automated LCD display assembly machine 40 commences with assembly machine 40 in the open position as shown in FIG. 1. In this position the Z axis drive system 44 is in its fully extended position. A robot (not shown) positions a lower glass plate 226 between lower plate XY stage 46 and upper plate positioning stage 48. When thus positioned, lower glass plate 226 is already etched as desired and has ultraviolet sensitive glue strips and dots placed on the upper side in locations as desired for the particular application. Loader 246 is raised until suction cups 64 come into contact with the underside of lower glass plate 226 that is being supported by the robot. Suction is then drawn into suction cups 264 such that lower glass plate 226 is firmly attached to suction cups 264. At this time the loading robot releases lower glass plate 226 and withdraws to a neutral position away from automated LCD assembly machine 40. Loader 246 is lowered until lower glass plate 226 is resting on the upper surface of vacuum chuck 162.

Referring to FIG. 12, at this point adjustable banking pin 222x is activated and moves lower glass plate 226 to the left in the X direction (as depicted in FIG. 12) into contact with stationary banking pins 220. Adjustable banking pin 222y is then powered and moves lower glass plate 226 in the Y direction (upward in the depiction of FIG. 12) into contact with banking pin 220. The effect of this action by adjustable banking pin 222x and adjustable banking pin 222y is to force lower glass plate 226 into the upper left hand corner of vacuum chuck 162 and to hold lower glass plate 226 in such position. This positioning action is the first, coarse alignment of lower glass plate 226.

After lower glass plate 226 is in place, the robot delivers upper glass 306 to assembly machine 40. Upper glass plate 306 is already etched as desired. Additionally, glass spacing beads 480 are already applied to the underside of upper glass plate 306. Glass beads 480 are preferably four microns in diameter and are made to adhere to the underside of upper glass plate 306 in a conventional manner by static electricity. Glass beads 480 are distributed in a random manner over the underside of upper glass plate 306.

When upper glass plate 306 is appropriately positioned by the robot between lower plate XY stage 46 and upper plate positioning stage 48, upper loader 290 is lowered until suction cups 302 come into contact with the upper side of upper glass plate 306. The weight of upper loader 290 resting on the upper side of upper glass plate 306 is enough contact to enable suction cups 302 to engage upper glass plate 306. At this time, a vacuum is drawn in suction cups 302, thereby firmly affixing upper glass plate 306 to suction cups 302.

Figure 23:
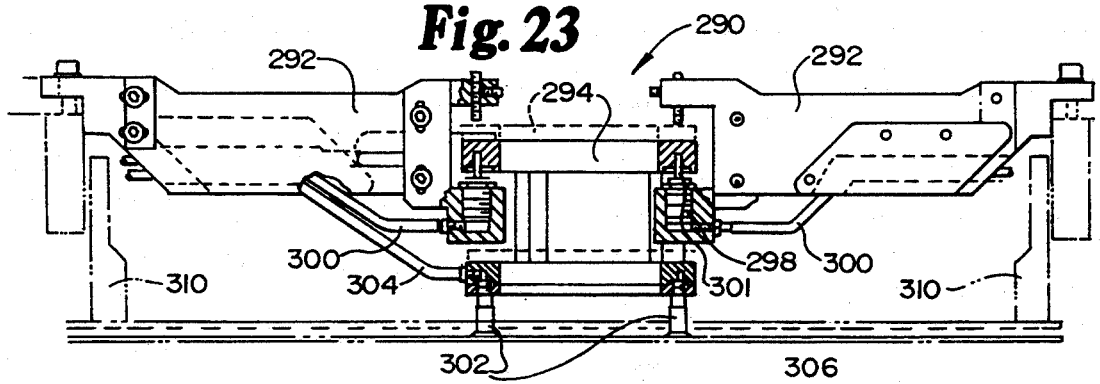
FIG. 23 is a side sectional view of the upper loader taken along line 23 of FIG. 21.

Upper loader 290 is raised pneumatically by air cylinders 298 as shown in FIG. 23. When upper loader 290 reaches its full upward travel, the outer periphery of upper glass plate 306 is placed in contact with the vacuum openings 314 of vacuum stations 310. Vacuum is then applied to vacuum stations 310 and the periphery of upper glass plate 306 is firmly held in place against the underside of upper chuck 272 by vacuum stations 310 and suction cups 302 of upper loader 290. When the robot releases upper glass plate 306 and withdraws from assembly machine 40, sagging of upper glass plate 306 is prevented by being held near the center of upper glass plate 306 by upper loader 290 and at the periphery by vacuum stations 310. Such sagging is a result of the increased area of the large glass plates 226, 306 that can be handled by the present invention. Preventing such sagging is crucial to achieving accurate alignment with lower glass plate 226 later in the fabrication process.

Figure 20:
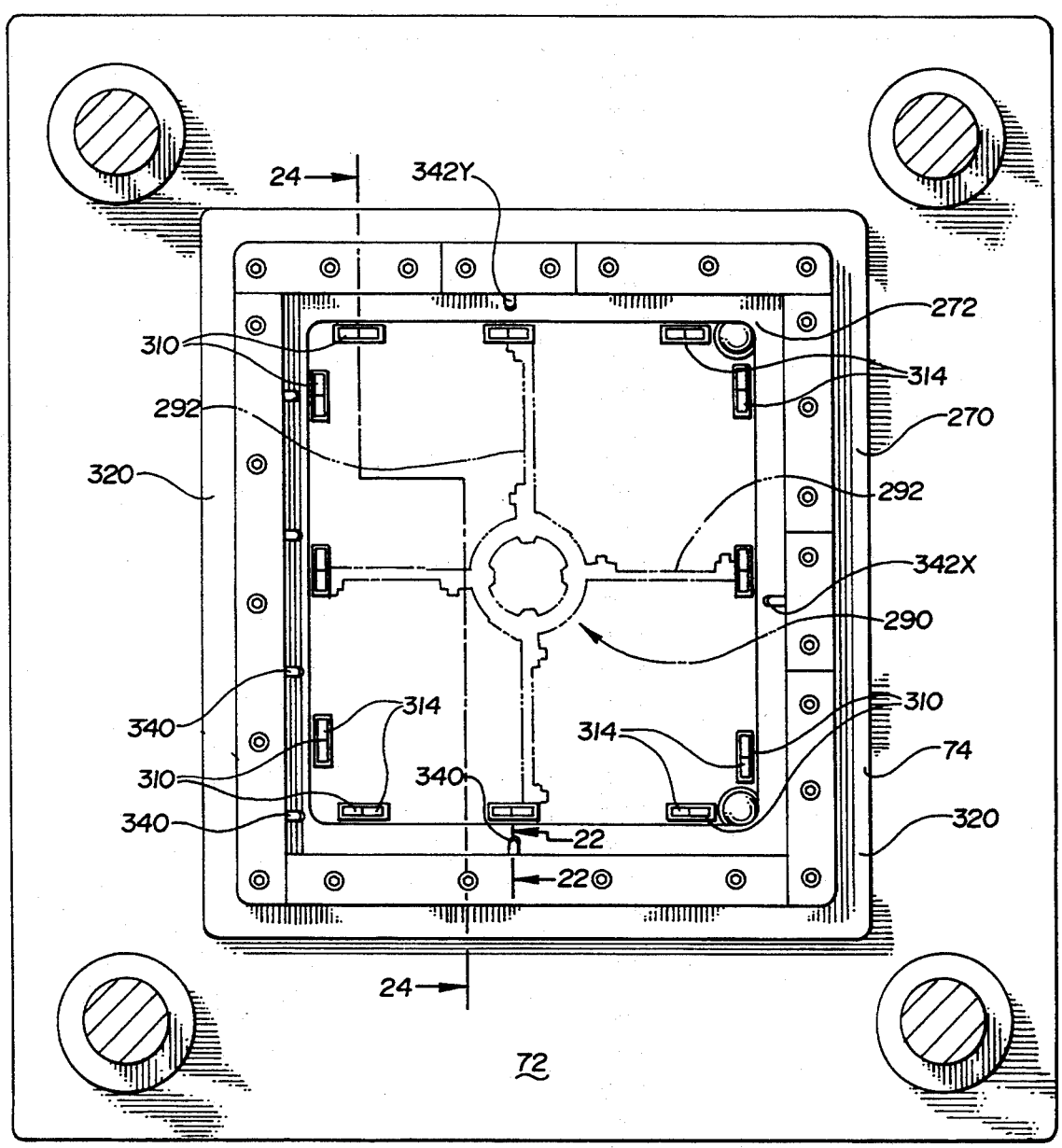
FIG. 20 is a perspective view of the underside of the upper plate positioning stage and upper plate receiver.
Figure 21:
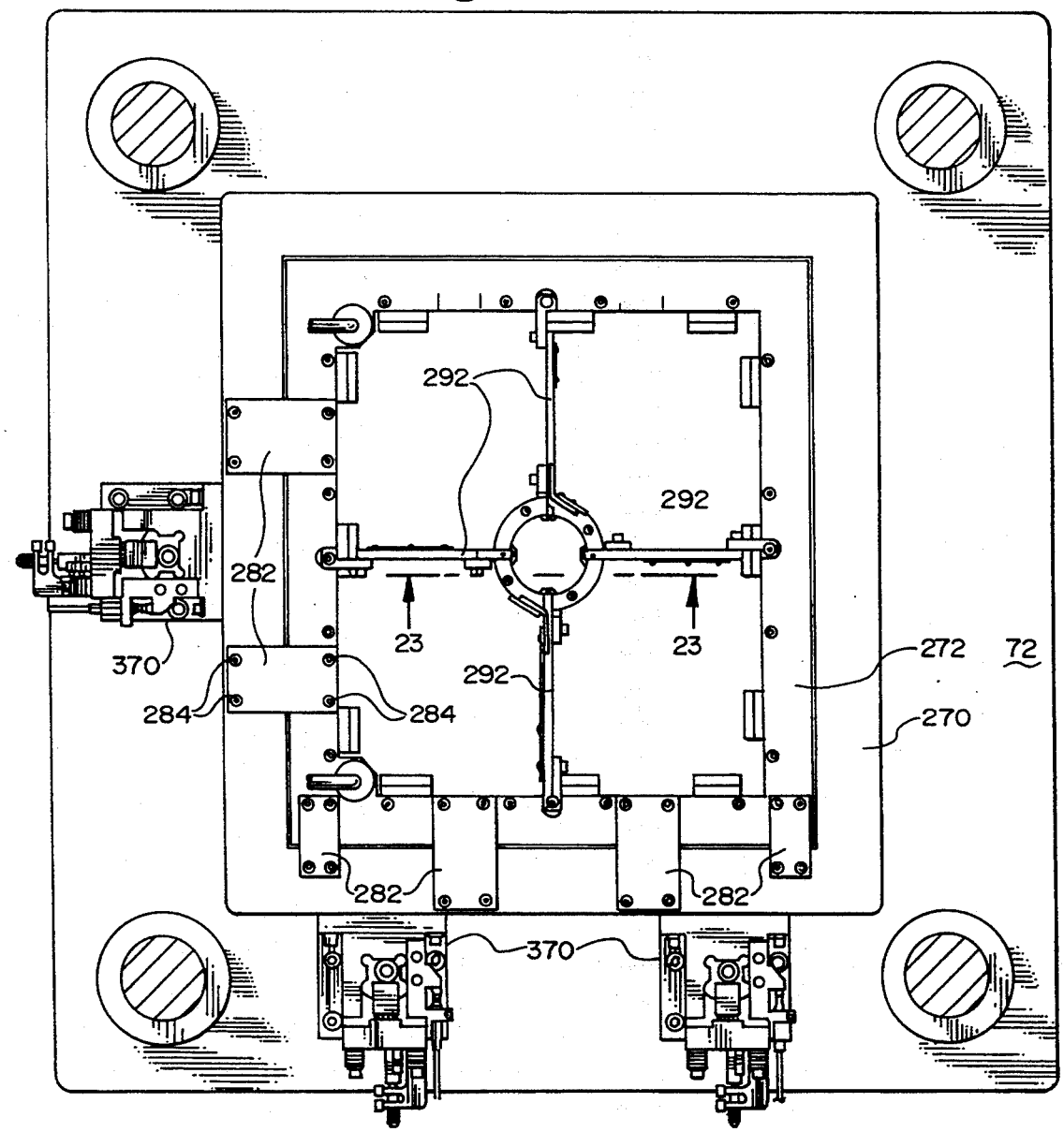
FIG. 21 is a upper view of the upper plate positioning stage and upper plate receiver.

Referring to FIG. 20, at this point in the process, adjustable banking pin 342x is activated and moves upper glass plate 306 to the left in the X direction, (as depicted in FIG. 20), into contact with stationary banking pins 340. Adjustable banking pin 342y is then powered and moves lower glass plate 226 downward in the Y direction into contact with banking pin 340. The effect of this action by adjustable banking pin 342x and adjustable banking pin 342y is to force lower glass plate 226 into the lower left hand corner of upper vacuum chuck 272, and to hold upper glass plate 306 in such position. This positioning action is the first, coarse alignment of upper glass plate 306.

At this point assembly machine 40 is still in the configuration essentially as shown in FIG. 1. Gross adjusting pneumatic cylinder 120 and fine adjusting pneumatic cylinder 122 are both in their fully extended positions. Z axis drive system 44 is then activated to lower upper plate positioning stage 48 and bring upper glass plate 306 to within 100 microns in the Z direction of lower glass plate 226. To accomplish this, gross adjusting pneumatic cylinder 120 is fully retracted. This position is known as the prestage position and is shown in FIG. 3.

As previously indicated, there is a Z axis drive system 44 at each of four corners of assembly machine 40. To lower upper plate positioning stage 48 to the prestage position, all four gross adjusting pneumatic cylinders 120 are simultaneously activated. Pneumatic cylinders 120 are designed to withdraw their respective piston shafts 134 simultaneously. In practice, however, there are slight withdrawal speed differences between the respective pneumatic cylinders 120. This difference in withdrawal speed results in one or more of the Z axis drive systems 44 out pacing the others. Such out pacing results in a skewing of upper plate block 72 and, in conventional systems, resulting bending stress on the various Z axis drive systems 44 that produces binding of the Z axis drive systems 44. To avoid the buildup of such stresses, the present Z axis drive system 44 was designed with magnetic bearing 86.

Since there is no mechanical connection between upper portion 82 and lower portion 84 of Z axis drive system 44, upper portion 82 is free to displace slightly, both axially and rotationally, with respect to lower portion 84 in response to the bending stresses induced by the varying withdrawal speeds of pneumatic cylinders 120 of the four Z axis drive systems 44. The axial and rotational shifting in two different directions is depicted by the phantom lines showing magnetic bearing 86 in FIGS. 8 and 9.

Once the Z axis drive systems 44 are in there fully lowered position, the self centering forces of the four magnetic bearings 86 tend to accurately realign the respective upper portions 82 and lower portions 84 of Z axis drive systems 44, thereby accurately orienting upper glass plate 306 above and parallel to lower glass plate 226. Magnetic bearings 86 provide an essentially frictionless connection that tolerates axial and rotational offset and prevents stress buildup within the elongated Z axis drive systems 44.

In the prestage position as depicted in FIG. 3, the first fine alignment of upper glass plate 306 and lower glass plate 226 is accomplished. At this stage, the upper glass plate 306 is suspended one hundred microns above lower glass plate 226. An advantage of performing the first fine alignment at this stage is that the alignment is performed prior to the upper glass plate 306 coming in contact with the glue strips that are on lower glass plate 226. This prevents any smearing of the glue during alignment.

It is important to bear in mind that lower traverse table 160 is borne on magnetic bearings 164 and upper traverse table 270 is borne on magnetic bearings 274. Magnetic bearings 164 and 274 exert a centering force tending to keep their respective traverse tables 160 and 270 in a centered position. Once traverse table 160 or 270 is displaced from the centered position the respective magnetic bearings 164, 274 exert a centering force tending to return traverse table 160 or 270 to the centered position. This centering force means that during the fine alignment procedures, there is a force generated by magnetic bearings 164, 274 that opposes the fine alignment forces that are generated by the action of the traverse adjusters 370.

The fine alignment system is best understood by reference to a schematic shown in FIG. 33a. Six motors are shown. These motors are the servo motors 382 that drive the camreed actuators 386 of traverse adjusters 370. Servo motors 382 act through traverse adjusters 370, in turn acting on traverse tables 160, 270 to move lower glass plate 226 and upper glass plate 306 in the X and Y coordinates relative to one another. The two cameras 454 provide signals to the computer that are representative of the state of alignment of lower glass plate 226 and upper glass plate 306.

Figure 32:
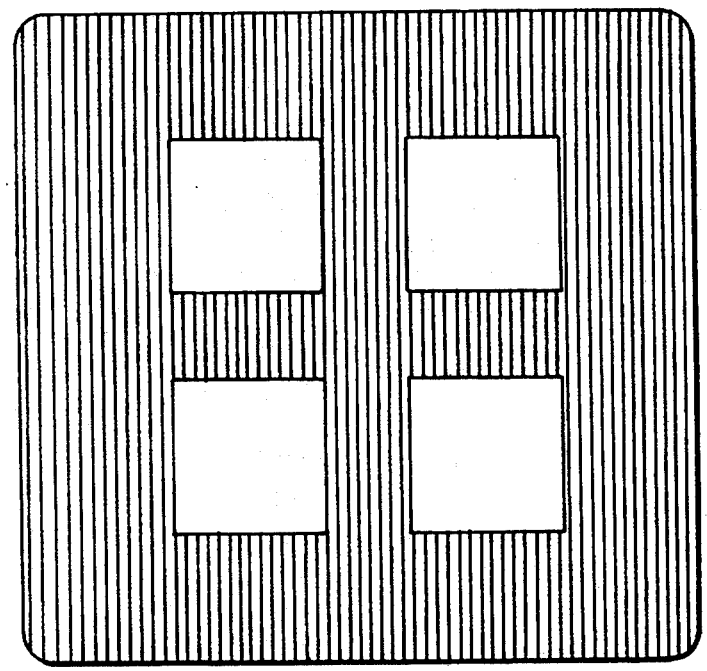
FIG. 32 is a depiction of the video representation of the video target in the aligned position.

In the prestage condition, the image received by the computer from camera 454 is as indicated in FIG. 32. Light from illuminator 450 shines through the window in the center of the opaque region. The computer 476 receives the image from cameras 454 and provides servo signals to the various traverse adjusters 370 to individually reposition both lower glass plate 226 and upper glass plate 306 to achieve the desired prestage image as indicated in FIG. 32. Feedback is provided by the individual LVDT 420 on each traverse adjuster 370 as to the amount of travel that remains available from the particular traverse adjuster 370 in a given direction until the maximum travel is reached. The maximum amount of travel that is available from a given traverse adjuster 370 is that which can be achieved by a ninety degree rotation of cammed actuator 386 in either direction from its neutral position. By interacting the commands to the various traverse adjusters 370 it is possible to achieve motion linearly in the X direction, linearly in the Y direction, and rotationally in the X, Y plane to accurately align lower glass plate 226 relative to upper glass plate 306.

Figure 31A:
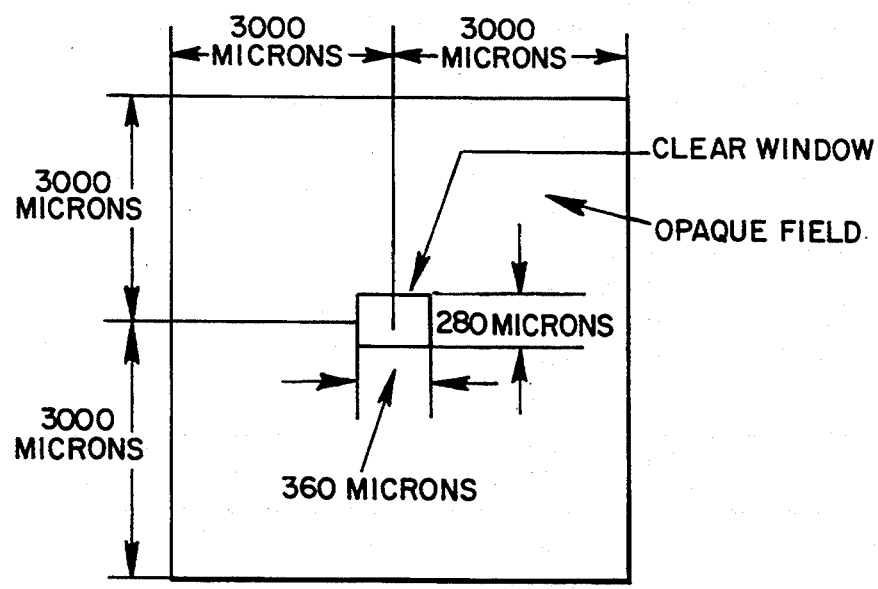
FIG. 31a is a depiction of the dimensions of the video target depicted in FIG. 31.
Figure 32A:
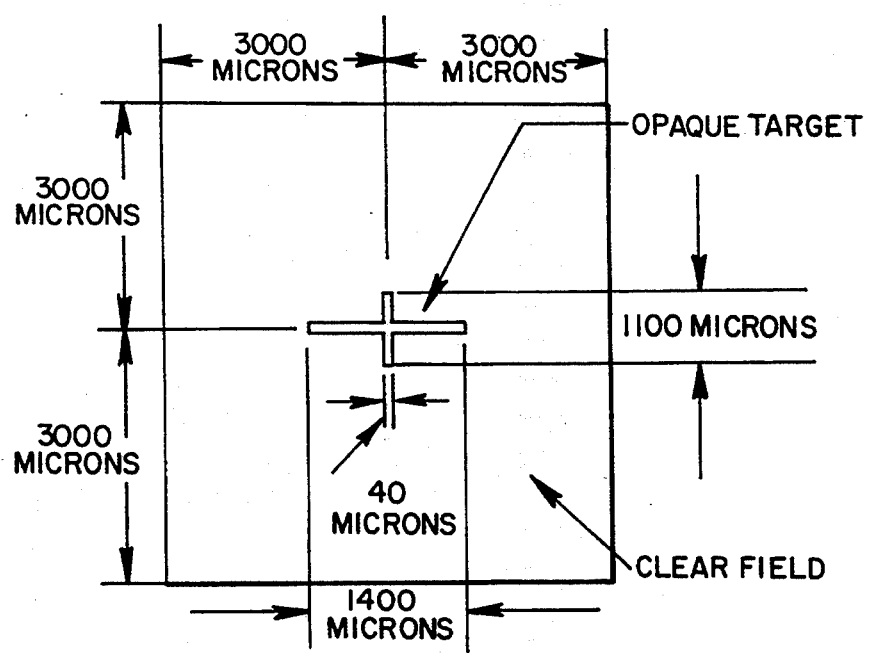
FIG. 32a is a depiction of the dimensions of the upper plate video target.

The target image depicted in FIG. 31a is etched on lower plate 226 and the target depicted in FIG. 32a is etched on upper plate. The fine alignment system will align the target images.

After the fine alignment is preformed in the prestage position, upper glass plate 306 is lowered onto lower glass plate 226 in what is known as the staged position as indicated in FIG. 4. This final lowering of upper glass plate 306 is accomplished by fully retracting the fine adjustment pneumatic cylinders 122 in the Z axis drive systems 44. The staged condition is shown in FIG. 25. Upper chuck 272 is allowed to rise slightly above traverse table 270 as upper glass plate 306 comes in contact with lower glass plate 226. This ensures a good contact between the two glass plates 226, 396. This effect is depicted in FIG. 24 by the phantom lines and the arrows 476. The effect is permitted by the flexing of flexures 282. In this position upper glass plate is free to move slightly in pitch and yaw in order to more perfectly align with lower glass plate 226.

In the staged position, the upper glass plate 306 is resting on the glue strips on the lower glass plate 226 and on the spacing spheres 480. Suction on the vacuum stations 310 that are on the opposite two sides of upper glass plate 306 from the two sides that the flexures 282 are located on is removed to accommodate the pitch and yaw motion of upper glass plate 306.

In the staged position, It is important to note the location of vacuum seal 320. Vacuum seal 320 seals the upper surface of upper glass plate 306 to the upper surface of lower traverse table 160. The effect of this sealing action is to create an air tight space that includes sealing retainer block 322 and the space between lower glass plate 226 and upper glass plate 306. A vacuum is drawn in the space sealed off by vacuum seal 320. The effect of drawing a vacuum between lower glass plate 226 and upper glass plate 306 is to apply a uniform and substantial force that forces the upper glass plate 306 into closer union with lower glass plate 226 and accounts for the wedge shaped imperfections in the two glass plates 226, 306. That the spacing between the plates 226, 306 becomes more uniform and more closely approximates the diameter of the glass beads (spacing spheres) 480. This more uniform spacing is indicated in the drawing of FIG. 5.

Once the space between the two glass plates 226, 306 is evacuated, the second fine alignment of procedure is performed. The alignment function is much the same as described for the prestage position, utilizing the traverse adjusters 370 to effect the alignment.

After the staged alignment is achieved, the ultraviolet curing lights are powered. Even as the glue is being cured by the ultraviolet lights and while the vacuum between the two glass plates 226, 306 is still being drawn, additional fine adjusting as being performed such that the accurate alignment of the two glass plates 226, 306 that was achieved during the second fine line procedure is maintained throughout the curing procedure. Adjustments continue to be made until the glue is set. This final aligning counters the tendency of the two glass plates 226, 306 to shift relative to one another while the glue is setting. The alignment devices of the present invention maintain the alignment of the two glass plates 226, 306 to ±0.5 micron until the glue is set.

After the glue is set, the vacuum under vacuum seal 320 is released the Z-axis drive system 44 is again actuated and is extended to its full extended position. The finished LCD display is raised by loader 246. A robot again comes in grasps the completed LCD display and removes it from assembly machine 40. Assembly machine 40 is now ready to perform the process again.

We claim

1. Apparatus for fabricating a flat panel display, the flat panel display having a display area greater than 645 square centimeters and being comprised of an upper glass plate and a lower glass plate and having data generation material interposed between the upper glass plate and the lower glass plate and being formed by simultaneously aligning the suitably etched upper glass plate with respect to the suitably etched lower glass plate in the X, Y, and Z planes and about the X, Y, and Z axes, the upper glass plate having spacing devices disposed on the lower side thereof and the lower glass plate having bonding material deposited on the upper side thereof, the apparatus having;

lower plate XY stage means for supporting the lower glass plate, the lower plate XY stage means being positionable in the X and Y planes;

upper plate positioning stage means for supporting the upper glass plate, the upper plate positioning stage means having vacuum devices that support the upper glass plate by adhering to the upper side of the upper glass plate at the periphery and the center portion of the upper glass plate and having gimbal devices that permit motion of the upper glass plate in the X, Y and Z planes and about the X and Y axes;

Z-axis drive means for positioning the upper glass plate with respect to the lower glass plate and being adapted for positioning the upper glass plate first in a prestaged position immediately above the lower glass plate and then in a staged position wherein the lower side of the upper glass plate is in contact with the bond deposits on the upper side of the lower plate prior to the bonding therewith;

vacuum means for forming an air tight seal enclosing the upper and lower glass plates and drawing a vacuum around and between the upper and lower glass plates when the upper and lower glass plates are in the staged position, which vacuum causes the imposition of a uniform pressure over the entire surface of the upper surface of the upper glass plate, said pressure urging the lower surface of the upper glass plate into parallel alignment with the upper surface of the lower glass plate, spaced apart by the spacing devices;

curing means for causing a reaction in the bonding material and the setting thereof; and alignment means for aligning the upper and lower glass plates, having sensor means for determining the relative alignment of the upper glass plate with respect to the lower glass plate, computational means for receiving the output of the sensor means and for generating a command representative of the difference between the desired alignment and the actual alignment of the upper glass plate with respect to the lower glass plate, traverse adjusting means for positioning the upper glass plate relative to the lower glass plate about the Z axis responsive to the command generated by the computational means, the traverse adjusting means performing an alignment in the prestaged position, the staged position, and during the setting of the bonding material.

2. Apparatus for fabricating a flat panel display, the flat panel display being comprised of an upper glass plate and a lower glass plate and having data generation material interposed between the upper glass plate and the lower glass plate and being formed by simultaneously aligning the suitably etched upper glass plate with respect to the suitably etched lower glass plate in the X, Y, and Z planes and about the X, Y and Z axes such that the upper glass plate overlies the lower glass plate, the upper glass plate having spacing devices disposed on the lower side thereof and the lower glass plate having bonding deposits disposed on the upper side thereof, and bonding the two plates together, the apparatus having;

upper glass plate support means for supporting the upper glass plate, having peripherally disposed vacuum ports being adapted for gripping the upperside periphery of the upper glass plate and having centrally disposed vacuum devices being coplanar with the peripherally disposed vacuum ports being adapted for gripping the central upperside of the upper glass plate, the peripherally disposed vacuum ports and the centrally disposed vacuum devices cooperating to support the upper glass plate in a planar orientation;

seal means extending from the upper glass plate support means and overlying the periphery of the lower glass plate support means for defining an airtight chamber surrounding the upper glass plate and the lower glass plate;

vacuum means for drawing a vacuum in the airtight chamber and for urging the upper glass plate into closer registry with the lower glass plate;

alignment means having two point alignment detectors being adapted for detecting the alignment of the upper glass plate with respect to the lower glass plate, upper glass plate and lower glass plate XY positioners being adapted for positioning the upper glass plate and the lower glass plate in the X and Y planes and about the Z axis, and a controller in a closed loop with the alignment detector and the upper glass plate and lower glass plate XY positioners for continually aligning the upper glass plate with respect to the lower glass plate about the Z axis, while the bonding material disposed between the upper glass plate and the lower glass plate is setting up.

3. An apparatus for producing flat panel displays having an upper glass plate and a lower glass plate being bonded together, comprising:

lower plate XY stage means for supporting and positioning a lower glass plate of the flat panel display, the lower plate XY stage means having;
a base plate block,
a lower traverse table defining a receptacle therein,
a plurality of magnetic bearings coupling the lower traverse table to the base plate,
lower vacuum chuck disposed within the receptacle of the lower traverse table, including
vacuum grooves to supply vacuum force to the lower glass plate to hold the lower glass plate in position,
banking pins to position the lower glass plate relative to the vacuum chuck, and
lower glass plate loader operably coupled to the base plate block to lower the lower glass plate on to the vacuum chuck upper plate positioning stage means for positioning and supporting the upper glass plate of the flat panel display;
upper plate positioning stage means for supporting and positioning a upper glass plate of the flat panel display, the upper plate positioning stage means having;
an upper plate block,
an upper traverse table defining a receptacle therein,
a plurality of magnetic bearings coupling the upper traverse table to the upper plate,
an upper vacuum chuck disposed within the receptacle of the upper traverse table, including;
vacuum ports to supply vacuum force to the upper glass plate to hold the upper glass plate in position;
banking pins to position the upper glass plate relative to the upper vacuum chuck;
vacuum seal to define an airtight chamber enclosing the upper and lower glass plates;
upper glass plate loader operably coupled to the upper traverse table to raise the upper glass plate onto the upper vacuum chuck and to provide support for the center portion of the upper glass plate; and
main support structure fixedly supporting the base plate block, including a base having four upwardly directed support legs attached thereto and supporting the base plate block,
wherein the upper glass plate and the lower glass plate are simultaneously aligned in the X, Y, and Z planes and about the X, Y, and Z axes during bonding of the upper glass plate and the lower glass plate.

4. An apparatus for producing flat panel displays as claimed in claim 3, including a Z-axis drive system for moving the upper plate positioning stage vertically relative to the lower plate XY stage.

5. An apparatus for producing flat panel displays as claimed in claim 4, wherein the Z-axis drive system is comprised of:
four drive assemblies each including;
a top portion;
a bottom portion; and
a magnetic bearing operably coupling the top portion and the bottom portion.

6. An apparatus for producing flat panel displays as claimed in claim 3, including fine alignment means for providing fine lateral positioning of the upper glass plate with respect to the lower glass plate having a plurality of traverse adjusters, the traverse adjusters having;
a base portion, including a servo motor and a cammed actuator;
a traversing portion, operably coupled to a glass plate for positioning thereof and having an adjusting block in operable engagement with the cammed actuator;
a position sensor afixed to the base portion and operably coupled to the traversing portion to sense the position of the traversing portion with respect to the base portion; and
a measuring section to provide sensor information on the movement of the upper glass plate and the lower glass plate with respect to one another, having;
a fiber optic/video alignment system sensing the alignment of a target etched on the upper glass plate with respect to a target etched on the lower glass plate having an illuminator illuminating the two target images and a camera receiving the combined image produced by the juxtaposed targets,
computational means in communication with the position sensor of the traverse adjusters and the camera for receiving input therefrom and generating commands to the traverse adjusters to position the upper glass plate and the lower glass plate with respect to one another responsive to the images received from the camera and the position information received from the position sensor of the traverse adjusters.

7. An apparatus for producing flat panel displays as claimed in claim 3, including ultraviolet gluing means for curing glue applied between the pair of glass plates while the plates are mounted within the apparatus.

8. A device for aligning and positioning an upper glass plate and a lower glass plate during the bonding of the upper and lower glass plates in the production of a flat panel display, comprising:
upper and lower dynamic positioning devices adapted for respective, independent movement of the upper glass plate and the lower glass plate whereby the upper glass plate can be selectively oriented with respect to the lower glass plate in the X and Y planes while at the same time providing a predetermined degree of freedom in the Z axis and a rotational degree of freedom about the X and Y axes such that the lower surface of the upper glass plate can be brought into parallel alignment with the upper surface of the lower glass plate;
a vacuum device adapted for presenting a uniform force on the upper surface of the upper glass plate, thereby urging the lower surface of the upper glass plate into parallel alignment with the upper surface of the lower glass plate; and
a position sensing and feedback system operably coupled to said dynamic positioning devices for sensing the relative position of the two glass plates in the X and Y axes and providing commands responsive to said sensed relative position to said dynamic positioning devices,
wherein the position sensing and feedback system dynamically adjusts the relative positions of the upper and lower glass plates and the uniform force on the upper surface of the upper glass plate acts to maintain the parallel alignment of said lower surface of said upper glass plate with the upper surface of the lower glass plate during said bonding of said upper and lower glass plates.

9. A device for aligning and positioning an upper glass plate and a lower glass plate as claimed in claim 8 wherein the vacuum device is adapted to draw a vacuum between the upper and lower glass plates, causing the atmospheric pressure to exert a highly uniform force on the upper glass plate, urging the upper glass plate into parallel conformance with the lower glass plate.

10. A device for aligning and positioning an upper glass plate and a lower glass plate as claimed in claim 9 further including a Z axis drive system adapted to grossly position the upper glass plate in registry with the lower glass plate, the Z axis drive system having a 2plurality of magnetic bearing means for accommodating and correcting misalignments of the Z axis drive system occurring during the positioning of the upper glass plate in registry with the lower glass plate.

11. A device for aligning and positioning an upper glass plate and a lower glass plate as claimed in claim 10 wherein the magnetic bearing means exert a centering bias upon the Z axis drive system in the X and Y planes and an attracting bias along the Z axis.

12. A device for aligning and positioning an upper glass plate and a lower glass plate as claimed in claim 11 wherein the magnetic bearing means comprise a plurality of magnetic spheres being disposed between a first and a second magnet.

13. A device for aligning and positioning an upper glass plate and a lower glass plate as claimed in claim 10 further including the Z axis drive system having an upper portion and a lower portion wherein the magnetic bearing means comprise a substantially frictionless and lubrication free interface between the upper portion and a lower portions of the Z axis drive system.

14. A device for aligning and positioning an upper glass plate and a lower glass plate as claimed in claim 10 further including a top plate receiver carried by the Z axis drive system, a traverse table shiftably carried by the top plate receiver, an upper chuck shiftably carried by the traverse table, and having loader means operably coupled to the upper chuck for receiving and supporting the upper glass plate, the loader means having a vacuum operated, selectively extendable gantry adapted to receive an upper glass plate when said gantry is in an extended receiving position, vacuum operated peripheral support means defined in the upper chuck for supporting the periphery of the upper glass plate, the loader means bringing the periphery of the upper glass plate into registry with the peripheral support means when the loader means is retracted from the extended receiving position to a retracted support position, the loader means and the peripheral support means acting cooperatively in supporting the upper glass plate to substantially eliminate sagging thereof.

15. A device for aligning and positioning an upper glass plate and a lower glass plate as claimed in claim 14 further including flexure mean operably coupling the upper chuck to the top plate receiver, the flexure means for stabilizing the upper glass plate supported by the upper chuck in the X and Y planes and accommodating motion of the upper glass plate about the X and Y axes and in the Z axis.

16. A device for aligning and positioning an upper glass plate and a lower glass plate as claimed in claim 14 further including a closed loop position sensing system for sensing the relative positions of the upper glass plate and the lower glass plate in the X and Y planes and about the Z axis, traverse adjusters fixedly joined to the top plate receiver and shiftably coupled to the traverse table, the traverse adjusters having actuators adapted to shift the traverse table to align the upper glass plate and the lower glass plate in the X and Y planes and about the Z axis responsive to the relative positions of the upper glass plate and the lower glass plate sensed by the sensing system.

17. A device for aligning and positioning an upper glass plate and a lower glass plate as claimed in claim 16 wherein the traverse adjuster has a base portion affixed to the top plate receiver and a traversing portion affixed to the traverse table and having a frictionless interface therebetween comprising a magnetic bearing having a first magnet affixed to the base portion, an opposed spaced apart second magnet affixed to the traversing portion and a plurality of magnetic spheres disposed therebetween.

18. A device for aligning and positioning an upper glass plate and a lower glass plate as claimed in claim 17 wherein the traverse adjuster has a measurement section communicatively coupled to the sensing system and being adapted to provide feedback thereto related to the range of travel of the traversing portion of the traverse adjuster and being operably shiftably coupled to the base portion by a magnetic bearing, the magnetic bearing having a centered position wherein the magnetic forces are balanced, the magnetic forces exerting a bias toward the center position when the magnetic bearing is displaced therefrom, a contact point being in engagement with the traverse adjuster, the magnetic bearing being held out of center causing the centering force exerted by the magnetic bearing to hold the contact point in engagement with the traverse table throughout a selected range of travel of the measurement section.

19. A device for aligning and positioning an upper glass plate and a lower glass plate as claimed in claim 16 wherein the position sensing system has two sensing means for simultaneously sensing the alignment of the upper and lower glass plates in the X and Y planes and about the Z axis.

20. A device for aligning and positioning an upper glass plate and a lower glass plate as claimed in claim 10 further including a bottom plate receiver carried by the Z axis drive system, a traverse table shiftably carried by the bottom plate receiver, a vacuum chuck shiftably carried by the traverse table, and having loader means operably coupled to the bottom plate receiver for receiving and disposing such plate on the vacuum chuck the lower glass plate, the loader means having a vacuum operated, selectively extendable gantry adapted to receive a lower glass plate when said gantry is in an extended receiving position, vacuum operated engaging means defined in the vacuum chuck for holding the upper glass plate in firm engagement with the lower chuck, the loader means bringing the lower glass plate into registry with the vacuum chuck when the loader means is retracted from the extended receiving position to a retracted position.

* * * * *